United States Patent
Koizumi

(10) Patent No.: US 11,044,765 B2
(45) Date of Patent: Jun. 22, 2021

(54) TERMINAL APPARATUS, COMMUNICATION SYSTEM, STORAGE MEDIUM, AND METHOD OF CONTROLLING TERMINAL APPARATUS

(71) Applicant: SEIKO EPSON CORPORATION, Tokyo (JP)

(72) Inventor: Junpei Koizumi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 38 days.

(21) Appl. No.: 16/523,145

(22) Filed: Jul. 26, 2019

(65) Prior Publication Data

US 2020/0037374 A1 Jan. 30, 2020

(30) Foreign Application Priority Data

Jul. 30, 2018 (JP) .............................. JP2018-142212

(51) Int. Cl.
| | |
|---|---|
| *H04W 76/10* | (2018.01) |
| *H04W 12/06* | (2021.01) |
| *H04W 48/16* | (2009.01) |
| *H04W 88/08* | (2009.01) |
| *H04W 72/08* | (2009.01) |
| *G06F 3/14* | (2006.01) |
| *H04W 68/00* | (2009.01) |
| *G06F 3/0488* | (2013.01) |
| *H04W 8/18* | (2009.01) |
| *H04W 84/12* | (2009.01) |

(52) U.S. Cl.
CPC .......... *H04W 76/10* (2018.02); *G06F 3/0488* (2013.01); *G06F 3/14* (2013.01); *H04W 8/18* (2013.01); *H04W 12/06* (2013.01); *H04W 48/16* (2013.01); *H04W 68/005* (2013.01); *H04W 72/085* (2013.01); *H04W 84/12* (2013.01); *H04W 88/08* (2013.01)

(58) Field of Classification Search
CPC ..... H04W 12/06; H04W 88/08; H04W 48/20; H04W 40/246; H04W 12/003; H04W 76/10; H04W 8/18
See application file for complete search history.

(56) References Cited

U.S. PATENT DOCUMENTS

| | | | | |
|---|---|---|---|---|
| 10,481,812 | B2 * | 11/2019 | Endo | ....................... G06F 21/85 |
| 2002/0085719 | A1 * | 7/2002 | Crosbie | ............. H04W 36/0011 380/248 |
| 2005/0276418 | A1 * | 12/2005 | Hagiwara | ............. H04L 9/3226 380/270 |
| 2010/0067406 | A1 | 3/2010 | Suzuki | |

(Continued)

FOREIGN PATENT DOCUMENTS

JP 2011-188518 9/2011

*Primary Examiner* — Raj Jain
(74) *Attorney, Agent, or Firm* — Workman Nydegger

(57) ABSTRACT

A terminal apparatus includes a communication circuit, a display unit, and a processor. The processor acquires a first SSID of an access point to which the communication circuit already made a connection, and a second SSID that is obtained by electronic equipment by performing scanning processing. The processor obtains the degree of the sameness of the first SSID and the second SSID, and performs display processing on the display unit in a mode in which display is performed in a manner that is more emphasized for visibility or the display is performed in a manner that takes precedence.

12 Claims, 10 Drawing Sheets

(56) References Cited

U.S. PATENT DOCUMENTS

2016/0353314 A1* 12/2016 Chow ................... H04W 8/245
2020/0008120 A1* 1/2020 Beck ................. H04W 36/0022
2020/0037374 A1* 1/2020 Koizumi ................. H04W 8/18

* cited by examiner

FIG. 5

| MAC ADDRESS | SSID | CHANNEL INFORMATION | INTERVAL OF TRANSMITTING BEACON | ... |
|---|---|---|---|---|

FIG. 6

| ITEM NUMBER | SSID |
|---|---|
| 1 | AAA |
| 2 | BBB |
| 3 | CCC |
| ⋮ | ⋮ |

FIG. 7

| SSID | MAC ADDRESS | RADIO WAVE STRENGTH |
|---|---|---|
| AAA | aa:aa:aa:aa:aa:aa | RSSIa |
| BBB | bb:bb:bb:bb:bb:bb | RSSIb |
| CCC | cc:cc:cc:cc:cc:cc | RSSIc |
| ⋮ | ⋮ | ⋮ |

FIG. 8

| XX | XX | XX | XX | XX | XX |
|---|---|---|---|---|---|

OUI (spans first three XX fields)

|  | 2.4 GHz BAND | 5 GHz BAND |
|---|---|---|
| EXAMPLE 1 | <VENDOR NAME>-2g | <VENDOR NAME>-5g |
| EXAMPLE 2 | <PRODUCT NAME>-G-XXXX | <PRODUCT NAME>-A-YYYY |
| EXAMPLE 3 | ZZZZ_1 | ZZZZ_2 |

# TERMINAL APPARATUS, COMMUNICATION SYSTEM, STORAGE MEDIUM, AND METHOD OF CONTROLLING TERMINAL APPARATUS

The present application is based on, and claims priority from JP Application Ser. No. 2018-142212, filed Jul. 30, 2018, the disclosure of which is hereby incorporated by reference herein in its entirety.

BACKGROUND

1. Technical Field

The present disclosure relates to a terminal apparatus, a communication system, a storage medium, a method of controlling the terminal apparatus, and the like.

2. Related Art

In JP-A-2011-188518, a technology is disclosed in which a user selects an SSID of a target for connection from among service set identifiers (SSIDs) that are displayed on a display unit of a multifunction machine that is capable of making a connection to a local area network (LAN), by operating an operation unit, and in which the multifunction machine thus makes a connection to an access point (AP).

A case is considered where electronic equipment is wirelessly connected to an access point using a terminal apparatus. In a case where the terminal apparatus is already wirelessly connected to the access point, it is desirable that the electronic equipment is wirelessly connected to the access point. The reason for this is that, by making a connection to the same access point, it is possible that data is transmitted and received reliably and securely between the terminal apparatus and the electronic equipment.

In a case where one access point supports multiple communication schemes, it is assumed that the access point has multiple SSIDs. At this point, if the terminal apparatus and the electronic equipment support the multiple communication schemes described above, it is possible that both the terminal apparatus and the electronic equipment refer to multiple SSIDs that are retained by the access point. In this case, only if an SSID that is used for the wireless connection to the access point can be provided to the electronic equipment, the electronic equipment is comparatively easily connected wirelessly to the access point to which the terminal apparatus is wirelessly connected. However, in a case where the terminal apparatus supports the multiple communication schemes and where, on the other hand, the electronic equipment supports one or several of the communication schemes, the electronic equipment cannot refer to all SSIDs that the terminal apparatus possibly refers to. For this reason, although the SSID that is used by the terminal apparatus for the wireless connection to the access point is known to the electronic equipment, the electronic equipment cannot refer to the SSID that is provided by the terminal apparatus, and because of this, cannot make a wireless connection to the access point using the SSID. In this situation, the electronic equipment cannot be easily connected wirelessly to the access point to which the terminal apparatus is wirelessly connected.

SUMMARY

According to an aspect of the present disclosure, there is provided a terminal apparatus including: a communication unit that performs communication with an access point and electronic equipment; a display unit, and a processing unit that performs control of the communication unit and display processing by the display unit, in which the processing unit acquires a first service set identifier (SSID) that is an SSID of the access point to which the communication unit already made a connection, acquires multiple second SSIDs that are the SSIDs which are obtained by the electronic equipment by performing scanning processing, obtains the degree of the sameness of the first SSID and the second SSID, and performs processing of displaying, on the display unit, the second SSID determined as having a high degree of the sameness, in a mode in which display is performed in a manner that is more emphasized for visibility than or the display is performed in a manner that takes precedence over the second SSID determined as having a low degree of the sameness.

BRIEF DESCRIPTION OF THE DRAWINGS

FIG. 5 is a diagram of a configuration of a beacon signal in compliance with Wi-Fi standards.

FIG. 6 is a diagram illustrating an example of an SSID list.

FIG. 7 is a diagram illustrating an example of the SSID list in which an association with the MAC address and the radio wave strength information is made.

FIG. 8 is a diagram illustrating a configuration of the MAC address.

DESCRIPTION OF EXEMPLARY EMBODIMENTS

The present embodiment will be described below. It is noted that the present embodiment which will be described below does not improperly limit the subject matter of the invention that is claimed in a claim. Furthermore, all configurations that will be described according to the present embodiment are not necessarily configurational requirements for the present disclosure.

1. Example of a Systematic Configuration

Figure 1:
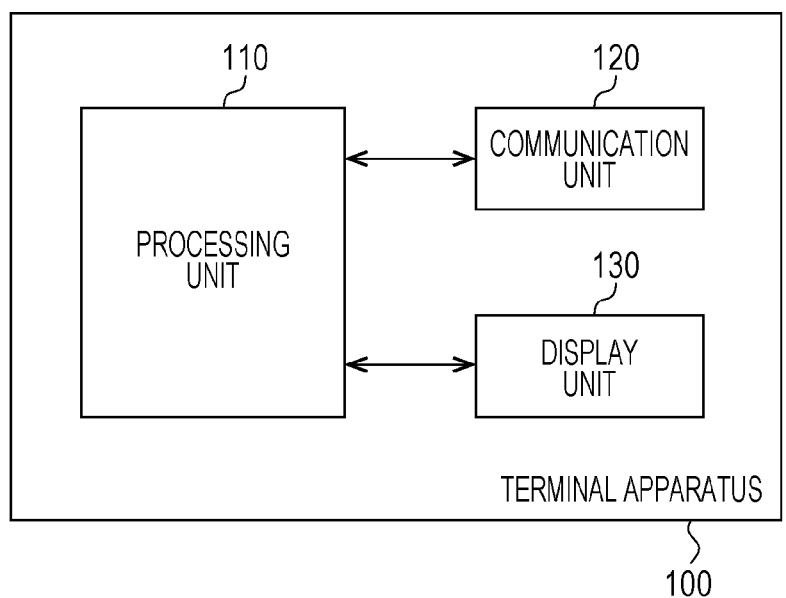
FIG. 1 is a diagram illustrating an example of a configuration of a terminal apparatus.

FIG. 1 is a block diagram illustrating an example of a configuration of a terminal apparatus 100 according to the present embodiment. The terminal apparatus 100 is a portable terminal apparatus, such as a smartphone or a tablet terminal. However, the terminal apparatus 100 may be one other apparatus such as a personal computer (PC).

The terminal apparatus 100 includes a processing unit 110, a communication unit 120, and a display unit 130. For example, the processing unit 110 is a processor or a controller, the communication unit 120 is a communication interface, and the display unit 130 is a display.

The processing unit 110 performs control of the communication unit 120 and performs display processing on the display unit 130. Each processing operation and each function according to the present embodiment, which is performed by the processing unit 110, can be realized by a processor that includes a hardware component. For example, each processing operation according to the present embodiment can be realized by a processor that operates based on information such as a program, and a memory in which the information such as a program are stored. For the processor here, for example, a function of each unit may be realized in individual hardware, or the function of each unit may be realized in integrated hardware. For example, the processor can include hardware components, and the hardware components can include at least one of a circuit that processes a digital signal and a circuit that processes an analog signal. For example, the processor can be configured with one or multiple circuit devices that are mounted on a circuit substrate, or with one or multiple circuit elements. The circuit device here is an integrated circuit (IC), or the like, and the circuit element is a resistor, a capacitor, or the like. The processor, for example, may be a central processing unit (CPU). However, the processor is not limited to the CPU, and it is possible that various processors such as a graphics processing unit (GPU) and a digital signal processor (DSP) are used. Furthermore, the processor may be a hardware circuit such as an application specific integrated circuit (ASIC). Furthermore, the processor may be configured with multiple CPUs, and may be configured with hardware circuits such as multiple ASICs. Furthermore, the processor may be configured with a combination of multiple CPUs and hardware circuits such as multiple ASICs.

The communication unit 120 performs communication with an access point and electronic equipment. It is noted that the access point here is an apparatus that performs wireless communication in compliance with the Wi-Fi standards and is an apparatus that is different from the terminal apparatus 100 and electronic equipment 200. The display unit 130 is configured with a display and the like on which various pieces of information are displayed for the user.

Figure 2:
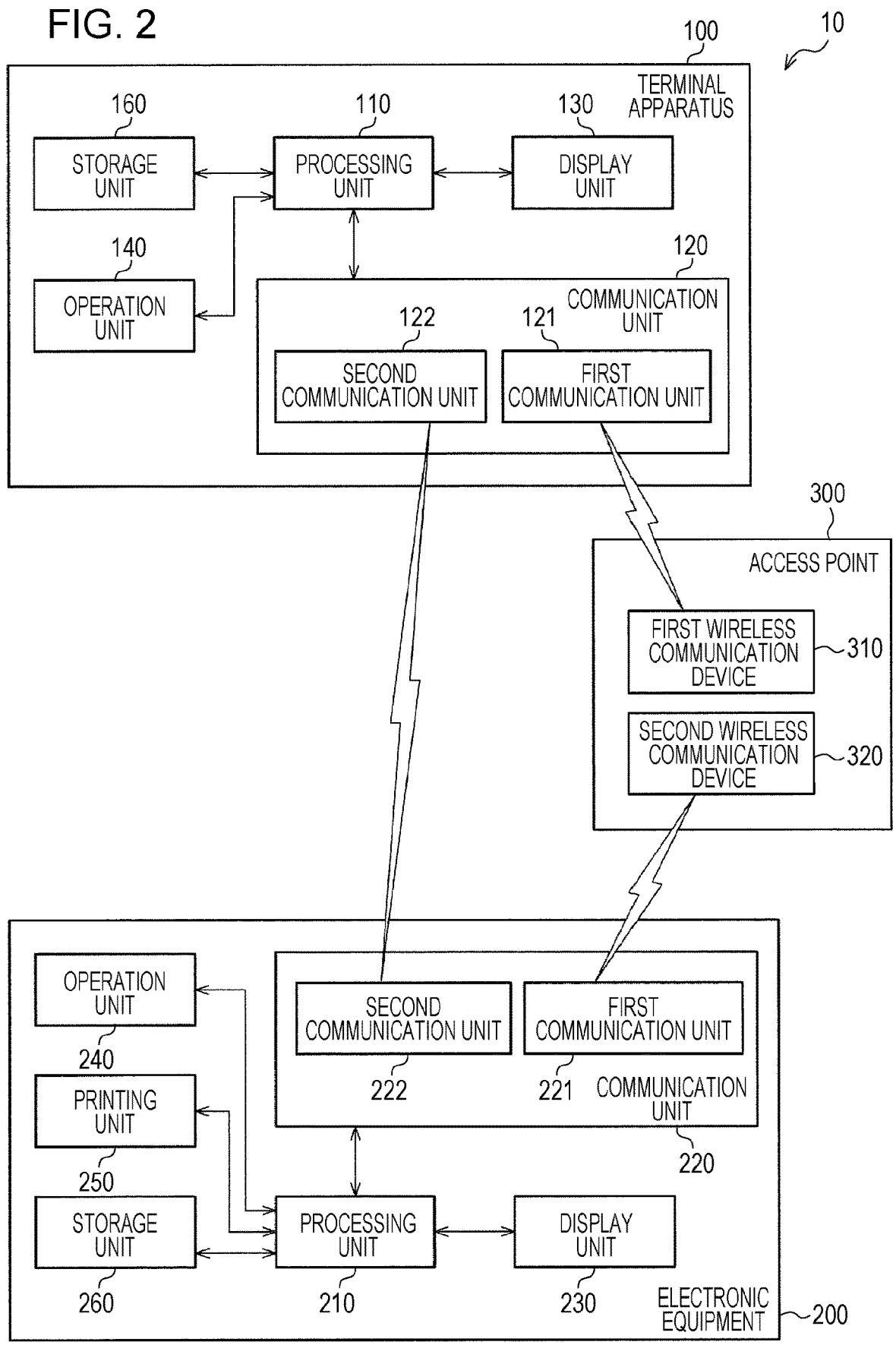
FIG. 2 is a diagram illustrating an example of a configuration of a communication system.

FIG. 2 is a diagram schematically illustrating an example of a communication system 10 that includes the terminal apparatus 100 according to the present embodiment. The communication system 10 includes the terminal apparatus 100 and the electronic equipment 200.

The communication unit 120 of the terminal apparatus 100 includes a first communication unit 121 and a second communication unit 122. The first communication unit 121 is a wireless communication device that performs wireless communication in compliance with a first wireless communication scheme, and performs communication with an access point 300. The second communication unit 122 is a wireless communication device into compliance with a second wireless communication scheme and performs communication with the electronic equipment 200. Each wireless communication device, for example, is a chip or a module that performs wireless communication.

The first wireless communication scheme is a wireless LAN in a narrow sense and is, more specifically, Wi-Fi. The second wireless communication scheme is a wireless communication scheme that is different from the first wireless communication scheme. The second wireless communication scheme is a wireless communication scheme that, in a narrow sense, complies with Bluetooth (a registered trademark) Low Energy standards. Bluetooth (a registered trademark) Low Energy will be described below as BLE. However, other communication schemes may be used as the first wireless communication scheme and the second wireless communication scheme.

In this manner, the use of a different wireless communication scheme makes it easy to connect the terminal apparatus 100 and the electronic equipment 200 to the same access point. For example, with the use of BLE as the second wireless communication scheme, the connection between the terminal apparatus 100 and the electronic equipment 200 can be established more easily than in the case of using Wi-Fi. Because of this, it is possible that information transmission and reception for making a connection to the same access point are smoothly performed.

Furthermore, in addition to the constituent elements that are illustrated in FIG. 1, the terminal apparatus 100 includes an operation unit 140 and a storage unit 160. The operation unit 140 is configured with a button or the like to which a user applies an input operation. It is noted that the display unit 130 and the operation unit 140 may be integrally combined into a touch panel.

Various pieces of information such as data and programs are stored in the storage unit 160. The processing unit 110 or the communication unit 120, for example, operates with the storage unit 160 as a working area. The storage unit 160 may be a semiconductor memory, such as a static random access memory (SRAM) or a dynamic random access memory (DRAM), be a register, be a magnetic storage device such as a hard disk drive (HDD), and be an optical storage device such as an optical disk device.

The electronic equipment 200, for example, is a printer. Alternatively, the electronic equipment 200 may be a scanner, a facsimile machine, or a copy machine. The electronic equipment 200 may be a multifunction peripheral (MFP) that has multiple functions, and a multifunction peripheral that has a printing function is also an example of the printer. The electronic equipment 200 may be a projector, a head-mounted display, wearable equipment, biological information measuring equipment, such as a pulse meter or a physical activity meter, a robot, video equipment, such as a camera, a portable information terminal, such as a smartphone, physical quantity measuring equipment, or the like.

The electronic equipment 200 includes a processing unit 210, a communication unit 220, a display unit 230, an operation unit 240, a printing unit 250, and a storage unit 260.

The processing unit 210 performs control of each of the units of the electronic equipment 200. For example, the processing unit 210 can include multiple CPUs, such as a main CPU and a sub-CPU, or a micro-processing unit (MPU). The main CPU performs control of each of the units of the electronic equipment 200 or overall control of the electronic equipment 200. The sub-CPU performs various processing operations for printing, for example, in a case where the electronic equipment 200 is a printer. Alternatively, a CPU for communication processing may be further provided.

The communication unit 220 includes a first communication unit 221 and the second communication unit 222. The first communication unit 221 performs the communication with the access point 300 through the wireless communication in compliance with the first wireless communication scheme. The second communication unit 222 performs communication with the terminal apparatus 100 through the wireless communication in compliance with the second wireless communication scheme. Each wireless communication device, for example, is a chip or a module that performs wireless communication.

The display unit 230 is configured with a display on which various pieces of information are displayed for the user, and the like, and the operation unit 240 is configured with a button to which the user applies an input operation, and the like. It is noted that, for example, the display unit 230 and the operation unit 240 may be configured to be integrally combined into a touch panel.

The printing unit 250 includes a printing engine. The printing engine has a mechanical configuration in which printing of an image is performed on a printing medium. The printing engine, for example, includes a transportation mechanism, an ink jet type discharge head, and a driving mechanism for a carriage including the discharge head, and the like. The printing engine discharges ink from the discharge head onto the printing medium that is transmitted by the transportation mechanism, and thus prints an image on the printing medium. As the printing medium, various media can be used such as a paper sheet and a piece of cloth. It is noted that a specific configuration of the printing engine is not limited to that described here as an example and may be one in which printing that uses toner is performed using an electrophotographic method.

Various pieces of information such as data and programs are stored in the storage unit 260. The processing unit 210 or the communication unit 220, for example, operates with the storage unit 260 as a working area. The storage unit 260 may be a semiconductor memory, may be a register, be a magnetic memory device, and be an optical storage device.

2. Flow for Processing

It is considered that setting relating to a wireless connection to the electronic equipment 200 is performed using the terminal apparatus 100. For example, in a case where the display unit 230 of the electronic equipment 200 is small-sized, or in a case where the electronic equipment 200 does not have the display unit 230, the use of the terminal apparatus 100 is effective for the wireless connection setting. Furthermore, in a case where the electronic equipment 200 has a display panel or the like, with the use of the terminal apparatus 100, it is also possible that a setting operation is easily performed.

As a means of performing wireless setting for the electronic equipment 200 using the terminal apparatus 100, for example, a technique is considered in which the electronic equipment 200 performs SSID scanning and thus creates a SSID list and in which the SSID list is displayed on the display unit 130 of the terminal apparatus 100. The user selects an SSID from the display list and inputs a password corresponding to the SSID. The terminal apparatus 100 transmits the SSID and the password to the electronic equipment 200 and thus makes a wireless connection to the electronic equipment 200.

If it is intended to set the electronic equipment 200 to be in a state of being available for Wi-Fi communication, the selection of the SSID by the user is easy. The reason for this is that the access point that is a target for connection is arbitrary. Because of this, if a password is already known, any SSID that is included in the SSID list may be selected.

However, in some cases, the information transmission and reception are performed between the terminal apparatus 100 and the electronic equipment 200. For example, in a case where the electronic equipment 200 is a printing apparatus, printing data is created in the terminal apparatus 100. Thereafter, the printing data is transmitted to the electronic equipment 200 through the wireless communication, and printing is performed in the electronic equipment 200. Because BLE is lower in communication speed than Wi-Fi, in a case where a certain amount of data, such as the printing data, is transferred, it is possible that user convenience is improved by using Wi-Fi.

On this occasion, it is desirable that the terminal apparatus 100 and the electronic equipment 200 makes a connection to the same access point. When this is done, the terminal apparatus 100 and the electronic equipment 200 include the network segment. Because of this, it is possible that data is transmitted and received reliably and securely between the terminal apparatus 100 and the electronic equipment 200.

When the wireless connection setting is performed for the electronic equipment 200 using the terminal apparatus 100, it is considered that the terminal apparatus 100 has already made a connection to a given access point. It is difficult for an application that runs on the terminal apparatus 100 to automatically perform changing of the access point to which a connection is to be made, and thus it is considered that the user needs to perform an explicit changing operation. More precisely, in order to reduce the burden on the user to perform an operation and to efficiently connect the terminal apparatus 100 and the electronic equipment 200 to the same access point, it is desirable that the electronic equipment 200 is connected to the access point to which the terminal apparatus 100 already made a connection. In this case, the user is not allowed to select an arbitrary SSID, and has to select an SSID that corresponds to the access point to which the terminal apparatus 100 already made the connection.

As illustrated in FIG. 2, in some cases, one access point 300 includes multiple wireless communication devices that vary in their communication schemes. For example, the first wireless communication device 310 is a device that performs communication which uses a first frequency band in compliance with the first wireless communication scheme, and a second wireless communication device 320 is a device that performs communication which uses a second frequency band in compliance with the first wireless communication scheme. More specifically, the first frequency band is a 5 GHz band, and the second frequency band is a 2.4 GHz band. That is, the first wireless communication device 310 is a device that performs communication which corresponds to standards such as IEEE802.11a, IEEE802.11n, and IEEE802.11ac, and the second wireless communication device 320 performs communication which corresponds to standards such as IEEE802.11b, IEEE802.11g, and IEEE802.11n. It is noted that a technique according to the present embodiment can apply to a case where the access point 300 includes multiple communication devices that vary in their communication schemes, and differences among communication schemes are not limited to the those described above. For example, a communication scheme in a frequency band other than the 2.4 GHz band and the 5 GHz band may be used. Furthermore, the differences among communication schemes are not limited to differences among communication frequency bands, and various modification implementations are possible.

An example will be considered below in which the terminal apparatus 100 corresponds to communication schemes in the 2.4 GHz band and the 5 GHz band, and in which a connection has been made to the first wireless communication device 310 that uses the 5 GHz.

In a case where the electronic equipment 200 corresponds to communication in the 5 GHz band, it is possible that the electronic equipment 200 receives a beacon signal which is transmitted by the first wireless communication device 310. That is, it is possible that the electronic equipment 200 acquires an SSID that corresponds to the first wireless communication device 310. On the other hand, because the terminal apparatus 100 already made the connection to the first wireless communication device 310, the SSID that corresponds to the first wireless communication device 310 is already known to the terminal apparatus 100. In this case, with the use of the same SSID, it is possible that the terminal apparatus 100 and the electronic equipment 200 are connected to the access point 300. That is, by urging the user to select the same SSID as is used by the terminal apparatus 100, it is possible to suitably assist the user in selecting an SSID.

On the other hand, in a case where the electronic equipment 200 corresponds only to the communication in the 2.4 GHz band without corresponding to the communication in the 5 GHz, the electronic equipment 200 cannot make a connection to the first wireless communication device 310. However, as illustrated in FIG. 2, the terminal apparatus 100 makes a connection to the first wireless communication device 310 and the electronic equipment 200 makes a connection to the second wireless communication device 320, the terminal apparatus 100 and the electronic equipment 200 are also connected to the same access point 300. Consequently, the terminal apparatus 100 may urge the user to select an SSID that corresponds to the second wireless communication device 320.

However, the SSID that corresponds to the first wireless communication device 310 and the SSID that corresponds to the second wireless communication device 320 are different from each other. For this reason, as in the example described above, in the technique in which an SSID with which the terminal apparatus 100 is being connected is presented, it is difficult to assist the user in selecting an SSID. Consequently, the terminal apparatus 100 according to the present embodiment makes a determination of whether or not each SSID that is included in the SSID list is an SSID of the same access point. The determination here of whether or not the same access point is present is specifically processing that estimates whether or not an access point that corresponds to an SSID which is a target for processing is the same as an access point to which the terminal apparatus 100 already made the connection.

The terminal apparatus 100 performs displaying that is based on a result of the determination of whether or not the same access point is present. Accordingly, it is possible that the user is suitably assisted in selecting the SSID and thus that the probability that the terminal apparatus 100 and the electronic equipment 200 will be connected to the same access point is increased.

Figure 3:
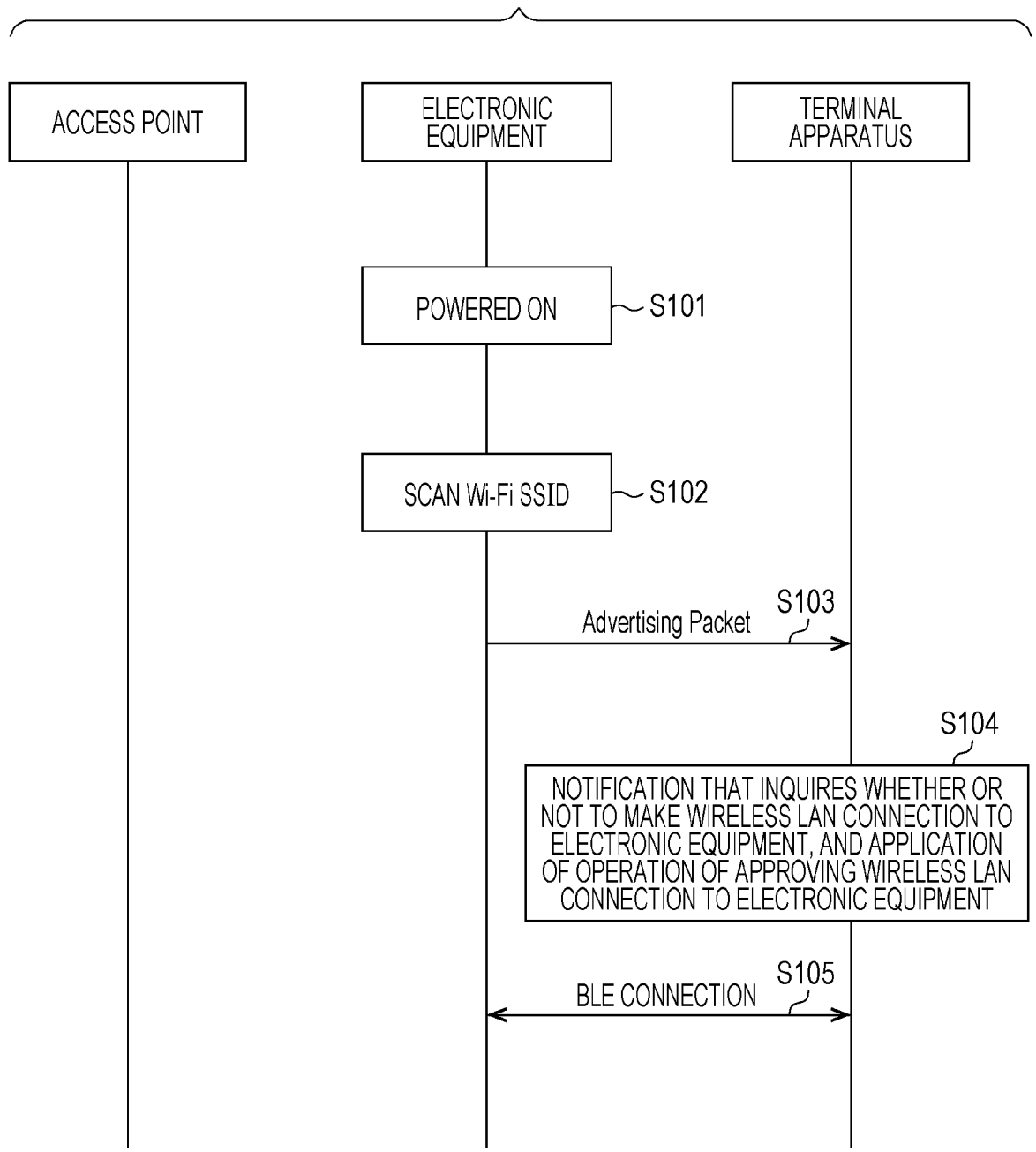
FIG. 3 is a sequence diagram for describing processing according to the present embodiment.
Figure 4:
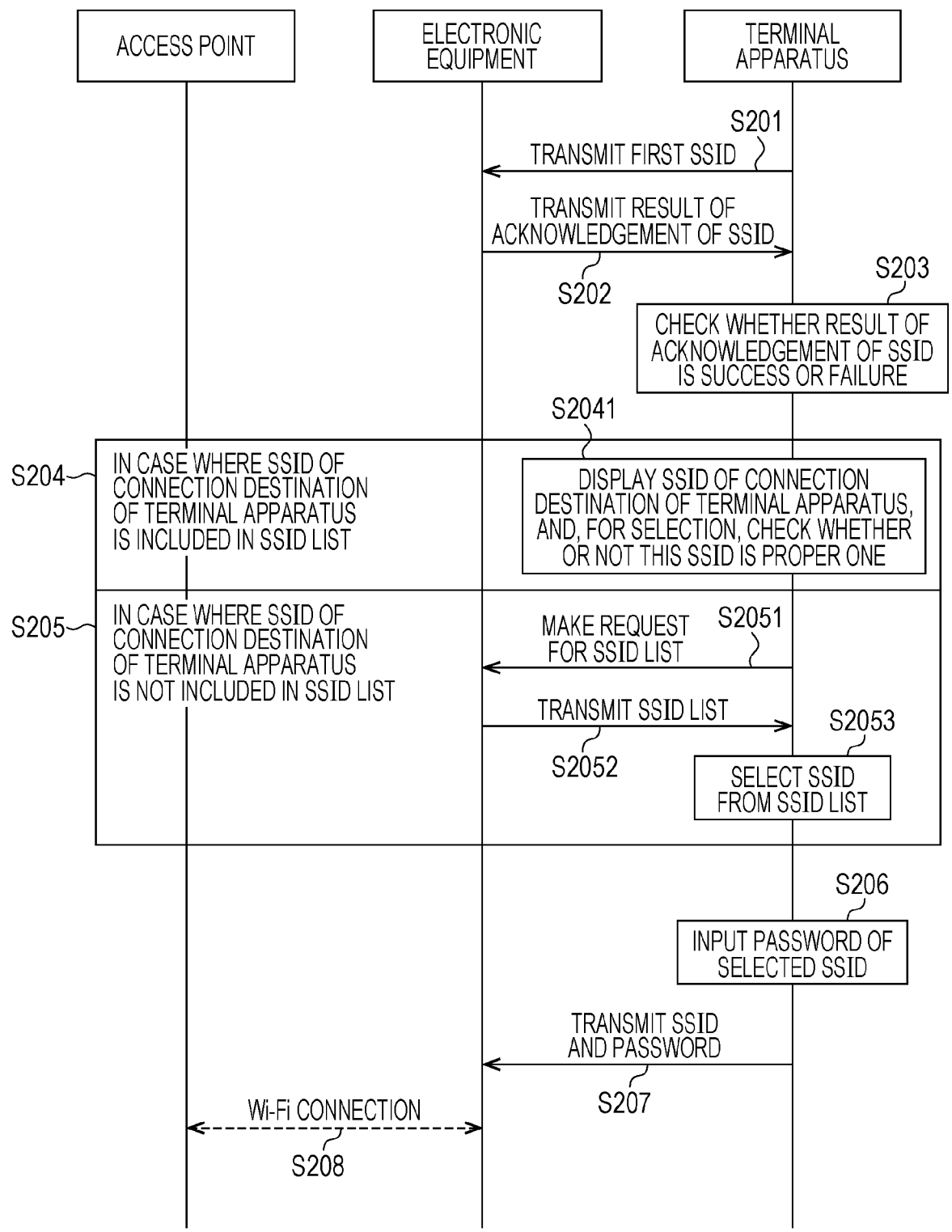
FIG. 4 is a sequence diagram for the processing according to the present embodiment.

FIGS. 3 and 4 are sequence diagrams each for describing a flow for processing according to the present embodiment. FIG. 3 is a diagram for describing a flow for performing a connection that uses BLE between the terminal apparatus 100 and the electronic equipment 200. To start this processing, first, the electronic equipment 200 is powered on (S101). When the electronic equipment 200 is powered on, the processing unit 210 executes firmware recorded in the storage unit 260, and thus the processing is performed as follows.

The processing unit 210 controls the first communication unit 221, thus performs reception of a beacon signal, and, based on a result of the reception, creates an SSID list (S102). The beacon signal here is a beacon signal in compliance with the Wi-Fi standards and includes an SSID. The beacon signal in compliance with the Wi-FI standards will be expressed below as a Wi-Fi beacon.

FIG. 5 is an example of a data structure of the Wi-Fi beacon. The Wi-Fi beacon is information that includes at least identification information on a device which is a transmission source, and an SSID. The identification information here is specifically a Media Access Control Address (MAC address). Furthermore, as illustrated in FIG. 5, the Wi-Fi beacon may include channel information or other information such as an interval of transmitting a beacon.

The processing unit 210 stores the created SSID in the storage unit 260. Specifically, the processing unit 210 acquires the SSID that is included in the beacon signal received by the first communication unit 221, and writes the acquired SSID on the SSID list. At this time, in a case where the acquired SSID is already included in the SSID list, the same SSID is not redundantly written the SSID list. FIG. 6 is a diagram illustrating an example of the SSID list according to the present embodiment. A value of the SSID that is illustrated in FIG. 6 is a value that is provided for convenience.

Next, the processing unit 210 controls the second communication unit 222 and thus transmits an advertising packet, as a beacon signal in compliance with the BLE standards (S103).

When receiving the advertising packet using the second communication unit 122, the processing unit 110 of the terminal apparatus 100 displays a screen for "notification that inquires whether or not to make a wireless LAN connection to electronic equipment" on the display unit 130. When the user applies an operation of "approving the wireless LAN connection to the electronic equipment" using the operation unit 140, the processing unit 110 selects the electronic equipment 200 as a partner to which to make an LBE connection (S104).

It is noted that, in a case where multiple pieces of electronic equipment that transmit the advertising packet are present, the processing unit 110 may display a screen for a list of pieces of electronic equipment on the display unit 130. At this point, the screen that is displayed is a screen on which electronic equipment, for example, are displayed in order of increasing a distance away from the terminal apparatus 100. Because distance estimation that uses the advertising packet is well known, a detailed description thereof is omitted.

Next, the processing unit 110 controls the second communication unit 122 and thus makes a BLE connection to the electronic equipment 200 (S105).

It is noted that, as illustrated in FIG. 3, subsequent to S105, a message that is generated according to a rule which is determined in advance may be transmitted and received between an application of the terminal apparatus 100 and an application of the electronic equipment 200. The electronic equipment 200 performs authentication processing that determines whether or not the message received from the terminal apparatus 100 is in accordance with the rule. The terminal apparatus 100 performs that authentication processing that determines whether or not the message received from the electronic equipment 200 is in accordance with the rule. However, the authentication processing is not limited to a technique that uses the message, and other authentication processing may be performed. Alternatively, the authentication processing may be omitted.

By performing the processing described above, it is possible that the information transmission and reception that use the BLE connection are possible between the terminal apparatus 100 and the electronic equipment 200. Consequently, subsequent to S105, a sequence for connecting the electronic equipment 200 to the access point 300.

FIG. 4 is a diagram for describing processing that connects the electronic equipment 200 to the access point 300. First, the second communication unit 122 of the terminal apparatus 100 transmits an SSID of the access point 300 to which the first communication unit 121 establishes a Wi-Fi connection, to the electronic equipment 200 through the BLE connection. An SSID of the access point 300 to which the first communication unit 121 is making the Wi-Fi connection will be expressed below as a first SSID.

Next, the processing unit 210 of the electronic equipment 200 determines whether or not the first SSID is included in the SSID acquired in S102. When it is determined that the first SSID is included in the SSID list, the processing unit 210 transmits a notification that acknowledgment of the SSID succeeds, to the terminal apparatus 100 through the BLE connection (S202). On the other hand, when it is determined that the first SSID is not included in the SSID list, the processing unit 210 transmits a notification that the acknowledgment of the SSID fails, to the terminal apparatus 100 through the BLE connection (S202).

The processing unit 110 of the terminal apparatus 100 checks a result of the acknowledgment of the SSID received from the electronic equipment 200 through the BLE connection (S203). As a result of the acknowledgment of the notification, the processing branches to S204 or S205.

In a case where the notification of the success as a result of the acknowledgment of the SSID is received, the first SSID that is used by the terminal apparatus 100 for connection is equivalent to a case where it is also possible that the electronic equipment 200 conducts a search. For example, the first SSID is equivalent to a case where it is also possible that the first communication unit 221 of the electronic equipment 200 supports a communication scheme of the first wireless communication device 310, in a case where the first communication unit 121 of the terminal apparatus 100 is being connected to the first wireless communication device 310 of the access point 300.

In this case, processing in S204 is performed. Specifically, the processing unit 110 of the terminal apparatus 100 displays a screen for receiving an instruction to wirelessly connect the electronic equipment 200 to the access point 300 to which the first communication unit 121 is being connected, on the display unit 130. Specifically, the processing unit 110 displays a screen for checking whether or not the first SSID is selected as a target for a connection to the electronic equipment 200, on the display unit 130 (S2041).

When an operation of selecting the first SSID is applied by the user, the processing unit 110 displays a password input screen on the display unit 130 and a password of the SSID selected from the password input screen is input to the processing unit 110 (S206). In a case where processing in S204 is performed, the password that is input in S206 is a password that corresponds to the first SSID.

The processing unit 110 transmits the first SSID and the password, which is input in S206, to the electronic equipment 200 through the BLE connection (S207). Based on the first SSID and the password that are received the terminal apparatus 100 through the BLE connection, the processing unit 210 of the electronic equipment 200 establishes the wireless communication in compliance with the Wi-Fi standards with the access point 300 using the first communication unit 221 (S208).

It is noted that when the first SSID is present in the SSID of the electronic equipment 200, the terminal apparatus 100 does not make a request to the electronic equipment 200 for the SSID list. This serves the object of shortening at least the time the user waits, because it takes time to transmit the SSID list at a communication speed in compliance with the wireless communication scheme in compliance with the BLE standards. However, a modification implementation may be employed in which the electronic equipment 200 transmits the SSID list to the terminal apparatus 100 through BLE communication and in which it is determined on the terminal apparatus 100 side whether or not the first SSID is included in the SSID list.

On the other hand, in a case where the notification of the failure as a result of the acknowledgment of the SSID is received, the first SSID that is used by the terminal apparatus 100 for connection is equivalent to a case where it is possible that the electronic equipment 200 does not conduct a search. For example, the first SSID is equivalent to a case where it is also possible that the first communication unit 221 of the electronic equipment 200 does not support the communication scheme of the first wireless communication device 310, in the case where the first communication unit 121 of the terminal apparatus 100 is being connected to the first wireless communication device 310 of the access point 300.

In this case, processing in S205 is performed. Specifically, the processing unit 110 of the terminal apparatus 100 makes a request to the electronic equipment 200 for the SSID list through the BLE connection (S2051). According to the request for the SSID list from the terminal apparatus 100, the processing unit 210 of the electronic equipment 200 transmits the SSID list, which is stored in the storage unit 260, the terminal apparatus 100 through the BLE connection using the second communication unit 222 (S2052).

The processing unit 110 of the terminal apparatus 100 displays a screen for urging the user to select one from among SSIDs that are included in the SSID list received from the electronic equipment 200 through the BLE connection, on the display unit 130, and the user applies an operation of selecting the SSID to the processing unit 110 (S2053). On this occasion, the processing unit 110 performs processing that displays an SSID which has a high probability of corresponding to an access point that is the same as the access point 300 to which terminal apparatus 100 is being connected, in a manner that is emphasized for visibility or in a manner that takes precedence, and thus assists the user in the selection. A specific example will be described below. It is noted that, in the following, the SSID that is included in the SSID list will be expressed below as a second SSID.

Next, when any second SSID is selected from the SSID, the processing unit 110 displays the password input screen on the display unit 130, and a password of the SSID selected from the password input screen is input to the processing unit 110 (S206). In a case where the processing in S205 is performed, the password that is input in S206 is a password that corresponds to the second SSID selected from the SSID list.

The processing unit 110 transmits the second SSID selected in S2053 and the password that is input in S206, to the electronic equipment 200 through the BLE connection (S207). Based on the second SSID and the password that are received from the terminal apparatus 100 through the BLE connection, the processing unit 210 of the electronic equipment 200 establishes the wireless communication in compliance with the Wi-Fi standards with the access point 300 using the first communication unit 221 (S208).

3. Estimation Processing of the Same Access Point and Details of the Display Processing As described above with reference to FIG. 4, in a case where the electronic equipment 200 cannot use the same SSID as is used by the terminal apparatus 100, the terminal apparatus 100 urges the user to select one other SSID that is included in the same access point 300. For this reason, the terminal apparatus 100 performs processing that estimates whether or not the second SSID is an SSID of the access point to which the terminal apparatus 100 itself is being connected, on each second SSID that is included in the SSID list. As a specific example of a technique of estimating whether or not the same access point is present, a technique in which, based on the MAC address, a determination is made of whether or not the vendors are the same, and a technique in which a determination is made of the extent of the sameness of the SSIDs are the same will be both described below.

3.1 Determination that Vendors Are the Same 3.1.1. Details of Determination of Whether or Not the Vendors Are the Same As described above with reference to FIG. 5, a MAC address of a transmission source is included in the Wi-Fi beacon. For this reason, it is possible that the SSID and the MAC address are associated with each other. Furthermore, it is possible that the electronic equipment 200 acquires radio wave strength information indicating a reception radio wave strength that is present when receiving the Wi-Fi beacon. For this reason, it is possible that the SSID and the radio wave strength information are associated with each other.

FIG. 7 is a diagram illustrating a specific example of the SSID list that is acquirable by the electronic equipment 200. As illustrated in FIG. 7, the electronic equipment 200 stores the SSID acquired by scanning processing of the WI-Fi beacon, in a manner that is associated with each of the MAC address and the radio wave strength information. It is noted that a modification implementation in which the radio wave strength information is omitted is also available. The SSI is a string of characters, and it is possible that an arbitrary character of which the use is not prohibited, such as an alphabet, a symbol, and a numerical value, is included in the SSID. The MAC address is a 48-bit code, and for example, is expressed in hexadecimal numbers that are separated on a per-octet basis. The radio wave strength information is a received signal strength indicator (RSSI) and is a numerical value that is expressed in units of dBm.

At this point, using the MAC address, it is determined whether or not the first SSID that is used by the terminal apparatus 100 for making a connection, and the second SSID that is included in the SSID list correspond to the same access point.

The processing unit 110 of the terminal apparatus 100 according to the present embodiment acquires a first MAC address that is a MAC address of the access point to which the communication unit 120 already made the connection. For example, the processing unit 110 acquires the first MAC address using a function of an operating system (OS) of the terminal apparatus 100.

Furthermore, the processing unit 110 acquires multiple SSIDs that are obtained by the electronic equipment 200 by performing the scanning processing and the second MAC addresses that are MAC addresses which correspond to the multiple SSIDs, respectively, from the electronic equipment 200. The SSID here is the second SSID. For example, as illustrated in S2051 and S2052 in FIG. 4, the processing unit 110 acquires a second MAC address by performing processing that transmits a request for the SSID list and receives a response, through the BLE communication by the second communication unit 122.

However, in a case where the access point 300 has the first wireless communication device 310 and the second wireless communication device 320, it is considered that different MAC addresses are allocated to the wireless communication devices, respectively. For this reason, even in the case of the MAC address that corresponds to the same access point, in some cases, the first MAC address and the second MAC address are not completely the same.

For example, the first MAC address is a MAC address that corresponds to the communication which uses the first frequency band in compliance with the first wireless communication scheme, and the second MAC address is a MAC address that corresponds to the communication which uses the second frequency band in compliance with the first wireless communication scheme. The first wireless communication scheme is a communication scheme in compliance with the Wi-Fi standards. Furthermore, in the example described above, the first frequency band is the 5 GHz hand, and the second frequency band is the 2.4 GHz band, but other frequency bands may be used. In this case, even in the case of the same access point 300, the first MAC address and the second MAC address are different from each other.

Thus, based on the first MAC address and the second MAC address, the processing unit 110 makes a determination that a vendor which corresponds to the first MAC address and a vendor which corresponds to the second MAC address are the same.

At this point, the vendor is a person that provides an access point, and for example, is a manufacturer of wireless LAN routers, a dealer, or the like. Although multiple SSIDs or MAC addresses are present within the same access point, vendors that are specified from their respective MAC addresses are the same. That is, in a case where the vendor who corresponds to the first MAC address and the vendor that corresponds to the second MAC address are the same, there is a likelihood that access points that correspond to the two MAC addresses, respectively, will be the same. On the other hand, in a case where the vendor that corresponds to the first MAC address and the vendor that corresponds to the second MAC address are not the same, there is a sufficiently low likelihood that the access points that correspond to the two MAC addresses, respectively, will be the same. As described above, a determination of whether or not vendors are the same is made based on the MAC addresses, and thus it is possible that it is estimated whether the first MAC address and the second MAC address correspond to the same access point. In a narrow sense, in a case where communication frequency bands that are used in the terminal apparatus 100 and the electronic equipment 200 are different from each other, it is also possible that it is suitably estimated whether or not the same access points are present.

In a broad sense, two techniques are considered in which the determination of whether or not the vendors are the same is made based on the MAC address. One is a technique in which vendor identifiers that are included in the MAC addresses are directly compared with each other, and the other is a technique in which vendor names are specified from the vendor identifiers and in which the vendor names are compared with each other.

FIG. 8 is a diagram illustrating an example of a configuration of the MAC address. "X" in FIG. 8 indicates a numerical value in hexadecimal representation, and "XX" is 8-bit information. High-order 24 bits of the MAC address are referred to as an organizationally unique identifier (OUI). The MAC address is managed by the IEEE. Each vendor files an application for an OUI with the IEEE and uses the allocated OUI. Allocation to an apparatus is performed in such a manner that vendors do not have low-order 24 bits in common with each other, and thus an overlap of MAC addresses is avoided.

The processing unit 110 compares a vendor identifier of the first MAC address and a vendor identifier of the second MAC address with each other and, in a case where the vendor identifiers are the same, determines that the vendors are the same. The vendor identifier here is the OUI described above. When this is done, with a direct comparison between OUIs, the determination can be made of whether or not the vendors are the same.

However, a manufacturer of network apparatuses, and the like need to allocate unique MAC addresses to a large quantity of the apparatuses. For this reason, in many cases, one vendor acquires multiple OUIs. In this case, although OUIs are not the same, it cannot be determined that vendors which have the OUIs are different.

The terminal apparatus 100 includes the storage unit 160 in which association information, which results from associating a MAC address included in the vendor identifier and a vendor name with each other, is stored. As described above, management of MAC addresses and allocation of OUIs are performed by the IEEE, and the IEEE makes a database showing a correspondence relationship between an OUI and a vendor name open to the public. For example, the communication unit 120 receives the database that is made open to the public by the IEEE, at a given timing, and stores the received information as the association information in the storage unit 160.

Then, the processing unit 110 compares a vendor name that corresponds to the first MAC address and a vendor name that corresponds to the second MAC address with each other based on the association information and, in a case where the vendor names are the same, determined that the vendors are the same.

In this manner, conversion to vendor names is performed, and then comparison processing is performed. Thus, in a case where multiple OUIs are allocated to a vendor, it is also possible that the determination is suitably made of whether or not the vendors are the same. Furthermore, it is assumed that a database in the IEEE, which an OUI and a vendor name are associated with each other, is not updated with not too high frequency. Consequently, the association information is retained in the storage unit 160. Thus, the frequency with which the database is referred to over a network can be reduced and it is possible that an efficient determination is made of whether or not the vendors are the same.

However, association between an OUI that is included in the second MAC address and a vendor name also occurs in a case where corresponding information is not included in the association information, such as a case where the time elapsed from download of the association information. Consequently, in a case where information corresponding to the second MAC address is not included in the association information, the communication unit 120 receives a vendor name associated with the second MAC address over a network, and the processing unit 110 compares the vendor name that corresponds to the first MAC address and the vendor name that corresponds to the second MAC address with each other, based on the received vendor name, and, in the case where the vendor names are the same, determines that the vendors are the same. At this point, reception of information over the network is specifically reception of the database that is made open to the public by the IEEE. Furthermore, at this point, the vendor name associated with at least the second MAC address may be received, and various modification implementation of information that is specifically received are possible. For example, the communication unit 120 may receive only a difference between the association information that has been stored in the storage unit 160 and the database on the network and may receive the entire database on the network.

Furthermore, the processing unit 110 performs processing that stores information which results from associating the vendor name with the second MAC address, in the storage unit 160. On this occasion, processing that adds only the difference between the association information that has been stored in the storage unit 160 and the database on the network may also be performed, and processing that overwrites the entire association information may also be performed. When this is done, it is possible that the association information is suitably updated.

With the processing described above, the determination is made of whether or not the vendors are the same, based on the first MAC address and the second MAC address. Then, the processing unit 110 performs processing that displays, on the display unit 130, an SSID that corresponds to the second MAC address, based on which it is determined that the vendors are the same, in a mode in which display is performed in a manner that is more emphasized for visibility than or the display is performed in a manner that takes precedence over an SSID that corresponds to the second MAC address, based on which it is determined that the vendors are not the same.

The display for visibility emphasis display is a display mode in which emphasizing processing that improves the visibility is performed. For example, various modes are considered such as a mode of setting characters representing the SSID to be in bold, a mode of increasing a character size, a mode of changing a character color to a color different from a standard color, a mode of changing a background area color, and a mode of adding a figure, an icon, or the like to the vicinity of the character representing the SSID. Furthermore, the display for precedence represents a display mode in which a target takes precedence for display, and for example, various modes of the display for precedence are considered such as a mode of displaying the target on an upper portion of a list, a mode of display a precedence target and non-displaying a non-precedence target, and a mode of display the precedence target on a pop-up screen.

When this is done, the second SSID that has a high probability of indicating the same access point is displayed in a state of being recognizable by the user. Because of this, it is possible that the user is suitably assisted in selecting the SSID.

3.1.2 Radio Wave Strength Information

Furthermore, the processing unit 110 may acquire the radio wave strength information that corresponds to the SSID and the second MAC address, from the electronic equipment 200. Specifically, the processing unit 110 acquires information, as the SSID list, which is illustrated in FIG. 7. Then, in a case where multiple SSID that correspond to second MAC address, based on which it is determined that the vendors are the same, are present, the processing unit 110 performs processing that displays, on the display unit 130, an SSID associated with a high radio wave strength that is represented by the corresponding radio wave strength information, in the mode in which display is performed in a manner that is more emphasized for visibility than or the display is performed in a manner that takes precedence over an SSID associated with a low radio wave strength.

A case is also considered where multiple access points of the same vendors are present in a range where the electronic equipment 200 possibly receives the Wi-Fi beacon. For example, in many cases, the Wi-Fi beacon of the access point installed in a neighboring house in a multiple-dwelling complex is received, and it is also sufficiently considered that the vendors are the same.

At this point, the terminal apparatus 100 and the electronic equipment 200 are in a range where at least the BLE communication is possible. That is, it is assumed that the access point 300 to which the terminal apparatus 100 already made the connection is at some distance away from the electronic equipment 200. In other words, it is considered that a smaller number of blocking objects, such as a wall, are present and a reception radio wave strength is thus higher between the access point 300 to which the terminal apparatus 100 already made the connection, and the electronic equipment 200 than between any other access point and the electronic equipment 200. Consequently, the display for visibility emphasis or the display for precedence is performed using the radio wave strength information, and thus, it is possible that the user is suitably assisted in selecting the SSID.

3.1.3 Flow for Processing

Figure 9:
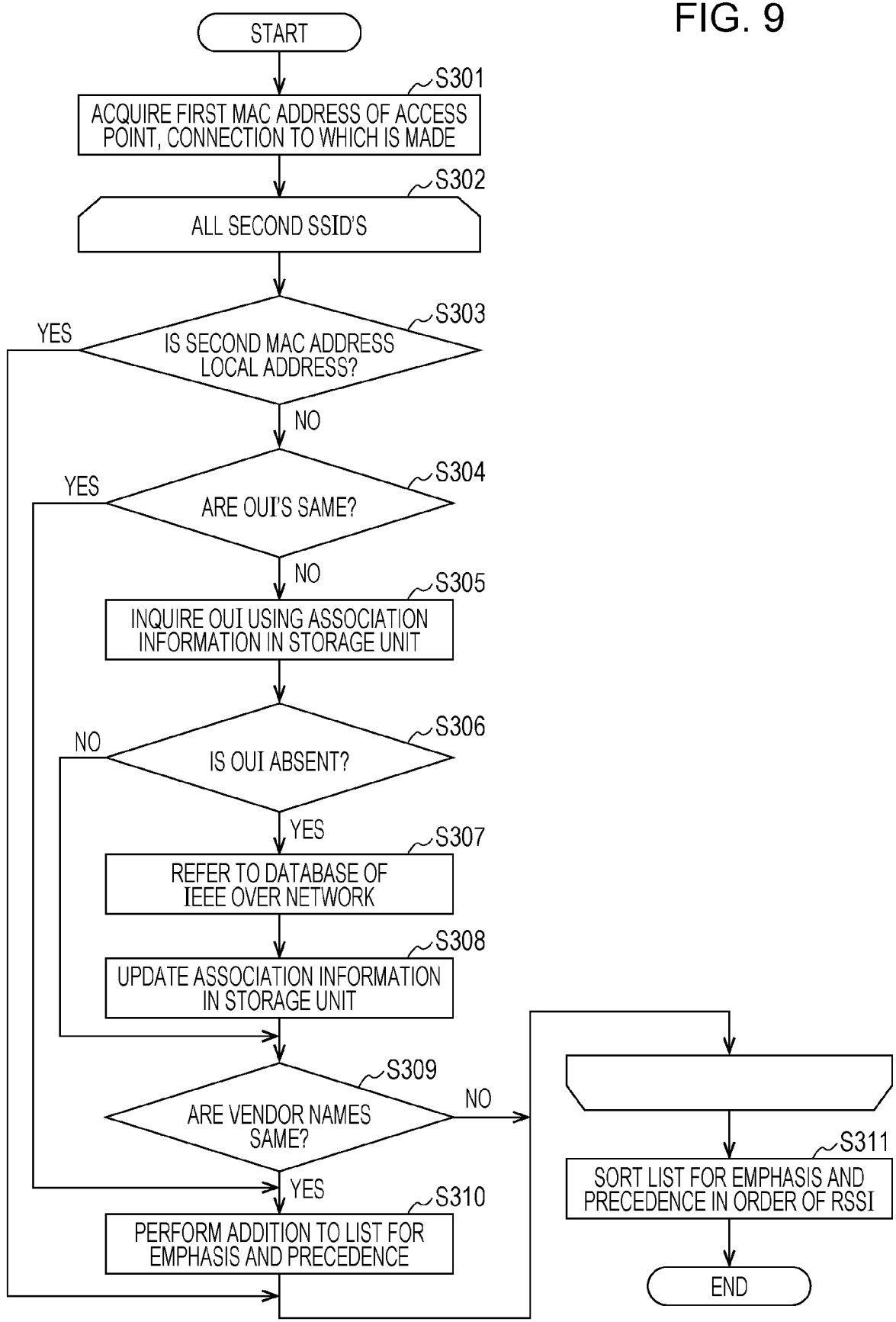
FIG. 9 is a flowchart for describing processing that includes a determination of whether or not vendors are the same.

FIG. 9 is a flowchart for describing processing according to the present embodiment described above, and corresponds to the processing in S2053 in FIG. 4. When this processing is started, first, the processing unit 110 acquires the first MAC address that is a MAC address of the access point 300, a connection to which is made (S301).

Next, the processing unit 110 performs processing, which will be described below, on each of the second SSIDs that are included in the SSID list acquired in S2052 (S302). First, with reference to a universal/local (U/L) bit of the second MAC address that corresponds to the second SSID, it is determined whether or not the second MAC address is a universal address or a local address (S303). It is noted that the U/L bits may be expressed as a G/L bit and that the universal address may be expressed as a global address.

In a case where the U/L bit that is included in the second MAC address is a value representing the local address, the processing unit 110 skips the determination of whether or not the vendors are the same, which is based on the first MAC address and the second MAC address. Specifically, in a case where the result in S303 is YES, processing operations that are illustrated in S304 to S310 are not performed, and proceeding to processing of the next second SSID takes place.

In a case where a U/L bit is "1", the MAC address having such a U/L is a local address that is not allocated from the IEEE. That is, because the high-order 24 bits of the local address is not an OUI that is allocated from the IEEE, using the MAC address, it is difficult to make the determination of whether or not the vendors are the same. At this point, in a case where the second MAC address is a local address, an SSID that corresponds to the second MAC address is not included in targets for display for visibility emphasis display or for display for precedence. When this is done, it is possible that the determination is made of whether or not the vendors are the same, and for example, the local address can be suppressed from being erroneously set to be a target for the display for visibility emphasis or for the display for precedence.

In a case where the U/L bit is "0" indicating the universal address (No in S303), the processing unit 110 determines whether or not an OUI of the first MAC address acquired in S301 and OUI of the second MAC address that is the target for processing are the same (S304). In a case where the OUIs are the same (Yes in S304), the processing unit 110 determines that a second SSID which corresponds to the second MAC address has a high probability of being an SSID of the access point 300 to which the terminal apparatus 100 is being connected, and adds the second SSID to a list for emphasis and precedence (S310). Subsequent to the processing in S310, if the second SSID remains in a non-processing state, the processing unit 110 returns to S303 and continues the processing. After the processing of all the second SSIDs is ended, the processing unit 110 comes out of a loop.

Furthermore, in a case where the OUIs are not the same (No in S304), using the association information stored in the storage unit 160 of the terminal apparatus 100, the processing unit 110 inquires the OUI of the first MAC address and the OUI of the second MAC address (S305).

As a result of the inquiry, in a case where both OUIs are present in the association information (No in S306), the processing unit 110 makes the determination of whether or not the vendor name that corresponds to the first MAC address and the vendor name that corresponds to the second MAC address are the same (S309). In a case where the vendor names are the same (Yes in S309), the processing unit 110 determines that a second SSID which corresponds to the second MAC address has a high probability of being an SSID of the access point 300 to which the terminal apparatus 100 is being connected, and adds the second SSID to a list for emphasis and precedence (S310). In a case where the vendor names are not the same (No in S309), the second SSID that corresponds to the second MAC address is not added to the list for emphasis and precedence.

Furthermore, as a result of the inquiry in S305, in a case where any one of the OUIs is not present in the association information (Yes in S306), with reference to the database that is provided by the IEEE over a network, the processing unit 110 performs processing that inquires an OUI (S307). Furthermore, with information acquired over the network, the processing unit 110 updates the association information stored in the storage unit 160 (S308). In addition to this, the processing unit 110 makes the determination of whether or not the vendor name that corresponds to the first MAC address and the vendor name that corresponds to the second MAC address are the same (S309). Processing operations subsequent to S309 will be the same as in a case where the result of the determination in S306 is No.

When the processing of all the second SSIDs is ended, the processing unit 110 performs processing that is based on the radio wave strength information, on the second SSID added to the list for emphasis and precedence, which is the target for processing (S311). For example, the second SSIDs added to the list for emphasis and precedence are sorted in order of radio wave strength, in such a manner that the SSID associated with a high radio wave strength takes precedence for display.

It is noted that in the flowchart in FIG. 9, an example is illustrated in which a determination of whether or not vendor identifiers are the same, a determination of whether or not local vendor names are the same, and a determination over a network of whether or not vendor names are the same are sequentially performed. Specifically, the processing unit 110 compares a vendor identifier of the first MAC address and a vendor identifier of the second MAC address with each other and, in a case where the vendor identifier are the same, determines that the vendors are the same. In a case where the vendor identifiers are not the same, it is determined whether the information corresponding to the second MAC address is included in the association information. Then, in a case where the information corresponding to the second MAC address is included in the association information, the vendor name that corresponds to the first MAC address and the vendor name that corresponds to the second MAC address are compared with each other based on the association information stored in the storage unit 160, and, in the case where the vendor names are the same, it is determined that the vendors are the same. On the other hand, in the case where information corresponding to the second MAC address is not included in the association information, the communication unit 120 is instructed to receive the vendor name associated with the second MAC address over a network, the vendor name that corresponds to the first MAC address and the vendor name that corresponds to the second MAC address are compared with each other based on the received vendor names, and, in the case where the vendor names are the same, it is determined that the vendors are the same.

When this is done, processing operations are sequentially performed, starting from the comparison processing, and, with a result of the determination in the upstream processing, downstream processing can be omitted. That is, it is possible that a processing load is reduced and thus that the determination is efficiently made of whether or not the vendors are the same.

However, the processing unit 110 is satisfactory if it can make the determination of whether or not vendors are the same. And a processing procedure is not limited to an example in FIG. 9. For example, the determination of whether or not OUIs are the same, which is illustrated in S304, may be omitted. In this case, an OUI is used in order to specify the vendor name, and the determination of whether or not the vendors are the same is necessarily realized by the determination of whether or not vendor names are the same.

3.1.4 Example of the Display Screen

An example of a specific display screen is described. 5 SSIDs, "AAA" to "EEE", are acquired as the second SSIDs, and a case is considered where each second SSID has the following relationship. With the determination of whether or not the vendors are the same, which is illustrated in FIG. 9 and other figures, it is determined that 3 second SSIDs, "AAA", "CCC", and "DDD" are the same in their vendors as the first SSID, and it is determined that 2 second SSIDs, "BBB" and "EEE" are not the same in their vendors as the first SSID. Furthermore, in a case where 3 radio wave strength associated with "AAA", "CCC", and "DDD" are compared with each other, "CCC" is the highest, "AAA" is the second highest, and "DDD" is the lowest.

Figures 10, 11:
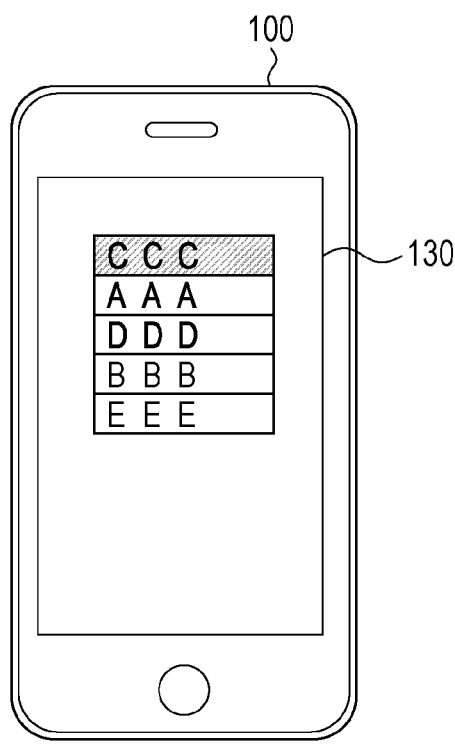
FIG. 10 is a diagram illustrating an example of a display screen.
FIG. 11 is a diagram illustrating specific examples of SSIDs in a first frequency band and a second frequency band.

FIG. 10 is a diagram illustrating an example of the display screen that is displayed on the display unit 130 of the terminal apparatus 100. As illustrated in FIG. 10, 3 SSIDs, "AAA", "CCC", and "DDD", are displayed in such a manner as to be higher on the list than any of "BBB" and "EEE". That is, the second SSID, based on which it is determined that vendors are the same, takes precedence for display over the second SSID, based on which it is determined that vendors are not the same. Furthermore, 3 SSIDs, "AAA", "CCC", and "DDD", are expressed in thicker characters than with "BBB" and "EEE". That is, the second SSID, based on which it is determined that vendors are the same is displayed in a manner that is more emphasized for visibility than the second SSID, based on which it is determined that vendors are not the same.

Moreover, in a case where 3 SSIDs, "AAA", "CCC" and "DDD", are compared with each other, "CCC" associated with a high radio wave strength is high on the list, and, among the 3 SSIDs, "DDD" associated with the lowest radio wave strength is the lowest on the list. That is, the second SSID associated with a high radio wave strength indicator takes precedence for display over the second SSIS associated with a low radio wave strength. Furthermore, a change from a background color of "CCC" to a color different from background colors of "AAA" and "DDD" takes place. That is, the second SSID associated with a high radio wave strength indicator is displayed in a manner that is more emphasized for visibility than the second SSIS associated with a low radio wave strength.

By displaying a screen that is illustrated in FIG. 10, it is clearly indicated that "CCC" is the second SSID having a high probability of indicating the same access point. Accordingly, it is possible that the user is suitably assisted in selecting the SSID. It is noted that, as described above, a mode of the display for visibility emphasis or of the display for precedence is not limited to that in FIG. 10. Furthermore, no limitation to both the display for visibility emphasis and the display for precedence is imposed, and either one may be omitted.

3.2 Determination of the Degree of the Sameness of the SSIDs 3.2.1 Details of Determination of Whether or Not SSIDs Are the Same The technique is described above in which the determination of whether or not the vendors are the same is made based on the MAC address, and thus in which it is estimated whether or not the same access point is present. In the technique that uses the MAC address, the processing unit 110 of the terminal apparatus 100 needs to acquire the first MAC address that corresponds to the access point, a connection to which has been made. However, in some cases, acquisition of the MAC address by an application is not approved depending on an OS of the terminal apparatus 100. The application here, for example, is software that runs on the processing unit 110.

Consequently, the processing unit 110 determines whether or not the same access point is present, using the degree of the sameness of the SSIDs. For example, a function of the processing unit 110 according to the present embodiment is realized by a first application for a first OS or a second application for a second OS. The first OS is an OS that approves the acquisition of the MAC address by the application. The first application is an application that determines whether or not the same access point is present, with the determination of whether or not the vendors are the same, which is based on the MAC address. The second OS is an OS that does not approve the acquisition of the MAC address by the application. The second application is an application that determines whether or not the same access point is present, with the determination of the degree of the sameness of the SSIDs. However, it is possible that both the determination of whether or not the vendors are the same, which is based on the MAC address, and the determination of the degree of the sameness of the SSIDs are made. The function of the processing unit 110 may be realized by an application that possibly performs switching to either one of the two determinations that is made according to the situation.

It is noted that the determination of the degree of the sameness of the SSIDs, which is described here, is different from processing that determines whether or not the first SSID is included in the SSID list, that is, the acknowledgment processing in S201 and S202. The determination here of the degree of the sameness of the SSIDs is a technique in which, in a case where the first SSID and the second SSID are different from each other, it is estimated whether or not the first SSID and the second SSID correspond to the same access point. The details of the determination of the degree of the sameness of the SSIDs will be described below.

As described above, in a case where the MAC address that is a universal address is used, each vendor needs to set an OUI allocated from the IEEE to high-order 24 bits. In contrast with this, the SSID is not particularly a rule that the vendor has to comply with, and has a higher degree of freedom than the MAC address. However, in many cases, the SSID that is set by the vendor complies with any naming rule.

FIG. 11 is a diagram illustrating examples of an SSID of the same access point, which is used in the 2.4 GHz band and an SSID that is used in the 5 GHz band. In Example 1, an SSID is set according to the naming rule that a string of characters representing a vendor name and a string of characters representing a communication frequency band are linked using a hyphen. A string of characters representing the communication frequency band, for example, is "2 g" in the case of the 2.4 GHz band and is "5 g" in the case of the 5 GHz band.

In Example 2, a SSID is set according to a rule that 3 strings, a string of characters representing a product name, a string of characters representing a communication frequency band, and a string of arbitrary characters, are linked using a hyphen. The character representing the communication frequency band, for example, is "G" in the case of the 2.4 GHz band and is "A" in the case of the 5 GHz. This corresponds to an alphabet at the rightmost position in each of IEEE 802.11g and IEEE 802.11a. Furthermore, arbitrary strings of characters, "XXXX", and "YYYY", for example, are parts of the MAC address. It is noted that a string here of characters reflects a case where a length is 1, like "G" or "A" that is described above.

In Example 3, an SSID is set according to the naming rule that an arbitrary string of character and a string of characters representing a communication frequency band are linked using a hyphen. The arbitrary string of characters is not a string of characters of which the meaning is understood when seeing a vendor name or a product name at a glance, but a common string of characters in the case of the 2.4 GHz band and in the case of the 5 GHz band is used. The arbitrary string of characters, for example, may be a serial number of an access point, or the like. Furthermore, the string of characters representing the communication frequency band, for example, is one number. In an example in FIG. 11, the character in the string is "1" in the case of the 2.4 GHz band, and is "2" in the case of the 5 GHz band.

As illustrated in FIG. 11, if the same access point is present, in most cases, an SSID in the 2.4 GHz band and an SSID in the 5 GHz band are similar. Specifically, in many cases, a part that results from excluding the string of characters representing the communication frequency band, particularly a string of characters on the front side of an SSID is the same.

Consequently, the processing unit 110 of the terminal apparatus 100 acquires the first SSID that is the SSID of the access point 300 to which the communication unit 120 already made the connection, and acquires the second SSIDs that are multiple SSIDs that are obtained by the electronic equipment 200 by performing the scanning processing, from the electronic equipment 200. Then, the degree of the sameness of the first SSID and the second SSID is obtained, and processing is performed that displays, on the display unit 130, the second SSID that is determined as having a high degree of the sameness in the mode in which display is performed in a manner that is more emphasized for visibility than or the display is performed in a manner that takes precedence over the second SSID that is determined as having a low degree of the sameness.

For example, the first SSID is an SSID that corresponds to the communication which uses the first frequency band in compliance with the first wireless communication scheme, and the second SSID is an SSID that corresponds to the communication which uses the second frequency band in compliance with the first wireless communication scheme.

The degree here of the sameness is information indicating the extent to which the first SSID and the second SSID are the same. Specifically, a character that is included in the first SSID and a character that is included in the second SSID are compared with each other, and the number of, and a ratio of, characters that are the same is the degree of the sameness. For example, a comparison is made between an i-th character in the first SSID and an i-th character in the second SSID, and the number of characters that are the same is counted. At this point, i is an integer that is increased or decreased by 1 in a range from 1 to L, and L is a value that is smaller than any one f the number of characters in the first SSID and the number of characters in the second SSID. The degree of the sameness of the SSIDs may be a result itself of the counting of the number of characters that are the same, and may be a ratio for the number of character that are the same. The ratio between the numbers of characters that are the same, for example, is a ratio of the number of characters that are the same to the number of characters in the first SSID, or a ratio for the number of characters that are the same to the number of characters in the second SSID.

As illustrated in FIG. 11, if the same access point is present, it is considered that the degree of the sameness of the first SSID and the second SSID is high to some extent. Consequently, the display mode is changed according to the degree of the sameness of the SSIDs, and thus it is possible that the user is suitably assisted in selecting the SSID. In a narrow sense, in a case where communication frequency bands that are used in the terminal apparatus 100 and the electronic equipment 200 are different from each other, a determination is also suitably made of whether or not the same access point is present, and it is possible that display in accordance with a result of the determination is performed.

It is noted the degree of the sameness may be the degree of the sameness of front-side characters. The extent of the sameness of front-side characters refers to the degree of the sameness of characters on the front side of the SSID, and, in a narrow sense, is the number of consecutive characters from the beginning of the SSID that are the same, or a ratio for the number of the characters thereof. Furthermore, the character here is an arbitrary character that is available for the SSID, may be any one of an alphabet, a number, and a symbol, and may be a Japanese letter or any other country' alphabet.

Figure 12:
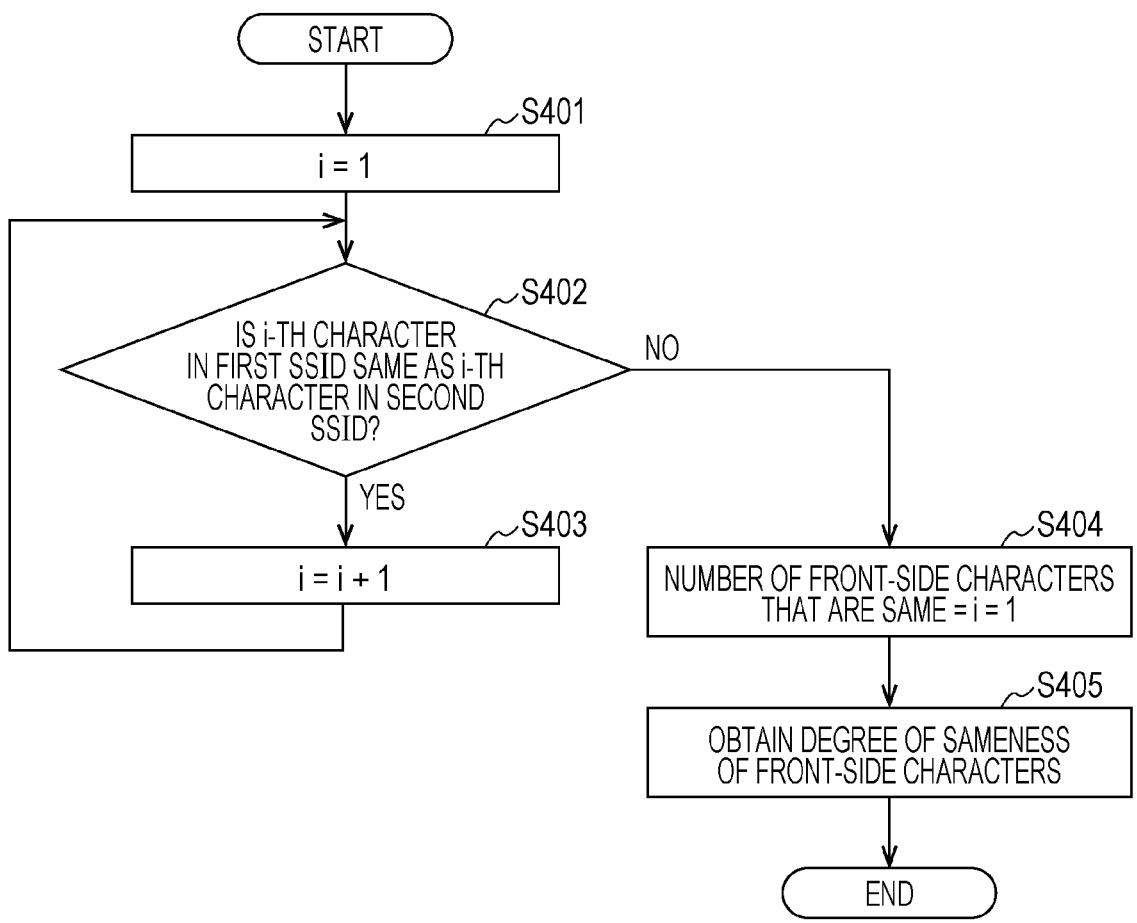
FIG. 12 is a flowchart for describing processing that determines the degree of the sameness of front-side characters of the SSID.

FIG. 12 is a flowchart for describing an example of processing that obtains the degree of the sameness of front-side characters. When the processing is started, the processing unit 110 initializes a variable i representing a comparative position, to 1 (S401).

Next, the processing unit 110 determines whether or not the i-th character in the first SSID and the i-th character in the second SSID are the same (S402). In a case where the sameness (YES in S402) is present, the processing unit 110 increments i (S403) and returns to S402. That is, in a case where the i-th character is same, proceeding to a comparison with the next character takes place. In a case where the i-th character in the first SSID and the i-th character in the second SSID are not the same (No in S402), the processing unit 110 determines (i−1) as the number of front-side characters that are the same (S404), and computes the degree of the sameness of front-side characters, based on the number of front-side characters that are the same (S405). It is noted that the number of front-side characters that are the same, as is, is set to be the degree of the sameness of front-side characters, it is possible that a step that is indicated by S405 is omitted.

In an example in FIG. 12, in a case where a character is not the same, processing that compares the first SSID and the second SSID is ended. That is, a string of characters that follows the character that is not the same is not included in the targets for the determination of the sameness. This because, as illustrated in FIG. 11, in many cases, a character on the front side of the SSID of the same access point is the same.

A configuration of the SSID In Example 1 and Example 3 in FIG. 11, the SSID is "string of common characters"+ "string of characters indicating a communication frequency band". Because that it is assumed that even in the same access point, the string of characters indicating the communication frequency band is not the same, it is reasonable that the determination of the degree of the sameness is made on the front side of the SSID. Furthermore, as in Example 2, in some cases, any string of characters that follows the "string of characters indicating the communication frequency band" is added, but in some cases, even in the same access point, the string of characters is not common. Conversely, even in different access points, in some cases, the following character is also the same. Because of this, there is a low need to use the extent of the sameness of the following characters for the determination of the sameness of the access points. That is, by using the degree of the sameness of front-side characters, it is possible that the determination is suitably made of whether or not the same access point is present.

It is noted that in FIG. 12, an example is illustrated in which a sequential comparison is made from the beginning from the front side until a character that is not the same appears, without determining a comparative range in advance. However, processing that obtains the degree of the sameness of front-side characters is not limited to this, and various modification implementations are possible. For example, as illustrated in FIG. 11, in many cases, a character indicating a separator, such as a hyphen or an underscore, is provided between a "string of common characters" and the "string of characters indicating the communication frequency band". For this reason, the processing unit 110 may detect in advance a range of characters that are present from the beginning of the first SSID until a separation symbol appears, and may perform processing that compares the range and the second SSID.

In Example 1 in FIG. 11, only a vendor name is a target for comparison, and, in Example 2, only a product name is a target for comparison. That is, a string of characters that is considered as having a high probability of the sameness if the same access point is present can be extracted as a target for comparison, and because of this, it is possible that the degree of the sameness of the SSIDs is suitably obtained.

3.2.2 Radio Wave Strength Information

Furthermore, the processing unit 110 may acquire the radio wave strength information that corresponds to the second SSID, which is the radio wave strength information indicating the radio wave strength, from the electronic equipment 200. For example, the processing unit 110 acquires information that is illustrated, as the SSID list, in FIG. 7. Alternatively, in a case where the degree of the sameness of the SSIDs is determined, the MAC address is unnecessary. Because of this, the processing unit 110 may acquire information that results from omitting the MAC address from FIG. 7. Specifically, on the electronic equipment 200 side, it may be determined whether the second MAC address and the radio wave strength information are transmitted in a state of being associated with the second SSID or the radio wave strength information is transmitted in a state of being associated with the second SSID, with the second MAC address being omitted. Alternatively, the electronic equipment 200 may transmit the second MAC address and the radio wave strength information in a state of being associated with the second SSID, and one terminal apparatus 100 side, it may be determined whether or not the second MAC address is used for processing.

Then, based on the degree of the sameness of the SSIDs and the radio wave strength information, the processing unit 110 controls the extent of the display of the second SSID for visibility emphasis or for precedence. As described above, the radio wave strength information is useful for the determination of whether or not the same access point is present. Particularly, in a case where the SSID has a higher degree of freedom of setting than the MAC address, and where the degree of the sameness of the SSIDs is used, there is a concern that the precision of the determination of whether or not the same access point is present will not be sufficient. Consequently, in a case where the degree of the sameness of the SSIDs is used, it is desirable that the radio wave strength information is positively.

For example, the processing unit 110 performs processing that does not include the second SSID, which is associated with the radio wave strength that is at or below a prescribed threshold, in the targets for the display for visibility emphasis or the display for precedence. When this is done, an access point that has a sufficiently low probability of being the same as another access point can be suppressed from being erroneously displayed for visibility emphasis or for precedence.

Furthermore, in the same manner as the example where the determination of whether or not the vendors are the same, the processing unit 110 may change the extent of emphasis or the extent of precedence according to a magnitude of the radio wave strength. Specifically, in a case where multiple second SSIDs that are determined as having an equal degree of the sameness are present, the processing unit 110 performs processing that displays, on the display unit 130, the second SSID which corresponds to the radio wave strength information indicating a high radio wave strength in the mode in which display is performed in a manner that is more emphasized for visibility than or the display is performed in a manner that takes precedence over the second SSID which corresponds to the radio wave strength information indicating a low radio wave strength.

When this is done, it is possible that display in a suitable mode is displayed taking into account both the degree of the sameness of SSIDs and the radio wave strength.

3.2.3 Flow for Processing

Figure 13:
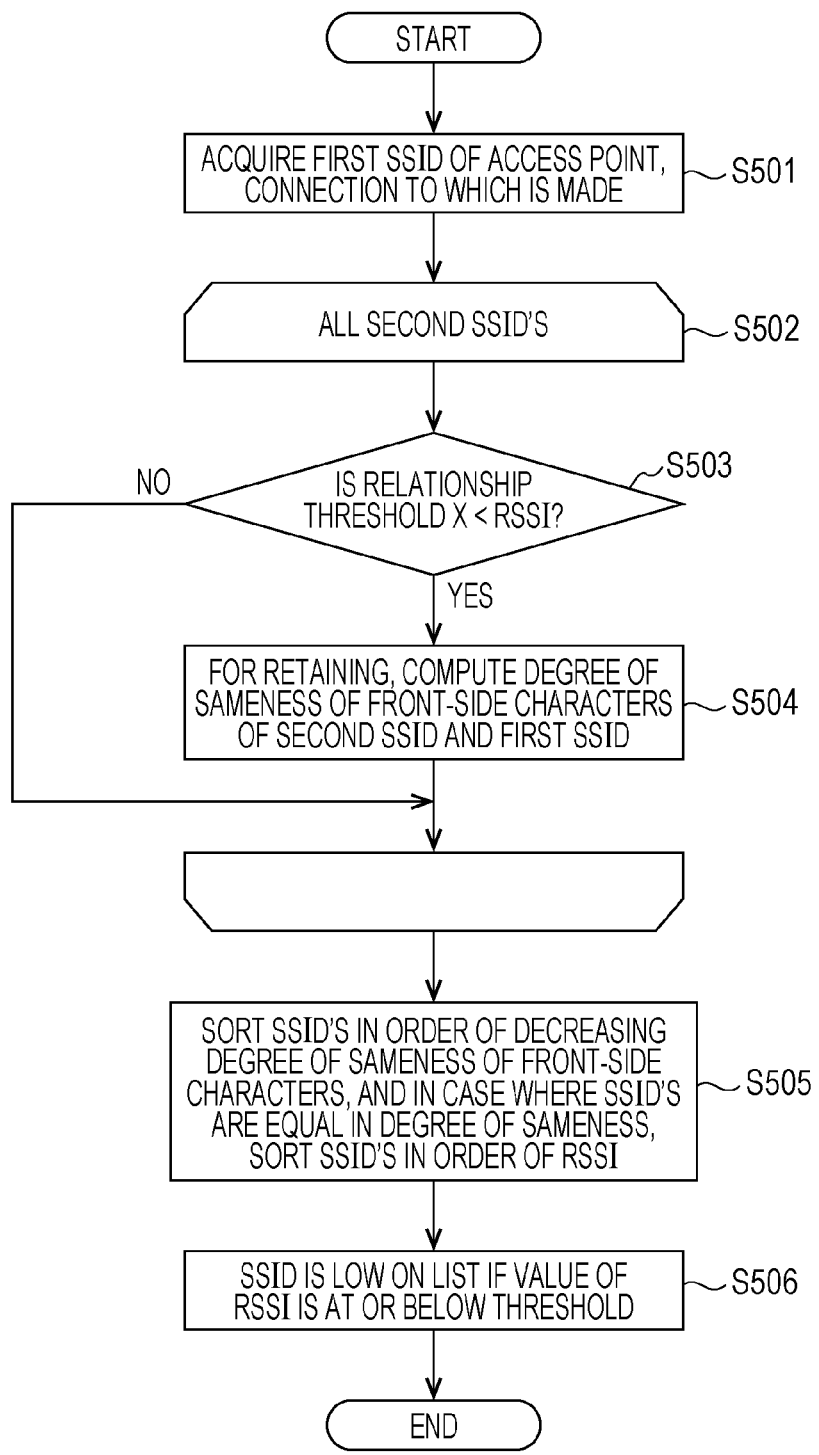
FIG. 13 is a flowchart for describing processing that includes a determination of the sameness of the SSIDs.

FIG. 13 is a flowchart for describing processing according to the present embodiment described above, and corresponds to the processing in S2053 in FIG. 4. When this processing is started, first, the processing unit 110 acquires the first SSID that is the SSID of the access point 300, a connection to which is made (S501).

Next, the processing unit 110 performs processing, which will be described below, on each of the second SSIDs that are included in the SSID list acquired in S2052 (S502). First, the radio wave strength information that corresponds to the second SSID is received, and it is determined whether or not a value of the radio wave strength is greater than a given threshold X (S503).

In a case where the radio wave strength is at or below the threshold (No in S503), the processing unit 110 skips processing in S504. Furthermore, in a case where the radio wave strength is above the threshold, (Yes in S503), the processing unit 110 determines whether or not the first SSID and the second SSID is the same (S504). The processing in S504, for example, is processing that is illustrated in the flowchart in FIG. 12.

In a case where the result in S503 is No, or subsequent to the processing in S504, if the second SSID remains in the non-processing state, the processing unit 110 returns to S503 and continues the processing. After the processing of all the second SSIDs is ended, the processing unit 110 comes out of a loop.

When the processing of all the second SSIDs is ended, the processing unit 110 first sorts the second SSIDs in order of decreasing the degree of the sameness, and, in a case where the second SSIDs are equal in the degree of the sameness, sorts the second SSIDs in order of decreasing the radio wave strength (S505). Furthermore, the second SSID associated with the radio wave strength that is at or below the threshold, of which the result of the determination is No in S503, is added to be low on the list (S506).

3.2.4 Example of the Display Screen

An example of a specific display screen is described. 5 SSIDs, "FFF" to "JJJ", are acquired as the second SSIDs, and a case is considered where each second SSID has the following relationship. It is noted that the SSID is expressed here for convenience, and this expression does not mean that the second SSID is a string of characters that is made up of 3 letters, that is, 3 alphabets. Regarding a determination of a threshold of a radio wave strength that is illustrated in S503 in FIG. 13, it is determined that "GGG" is associated with a radio wave strength that is at or below a threshold. Furthermore, all radio wave strengths with which "FFF", "HHH", "III", and "JJJ" are associated, respectively, are above the threshold, and a relationship among SSIDs in terms of the degree of the sameness of the SSIDs is "III">"FFF"="JJJ">"HHH". Furthermore, in a case where radio wave strengths with which "FFF" and "JJJ" are associated, respectively, "JJJ">"FFF".

Figure 14:
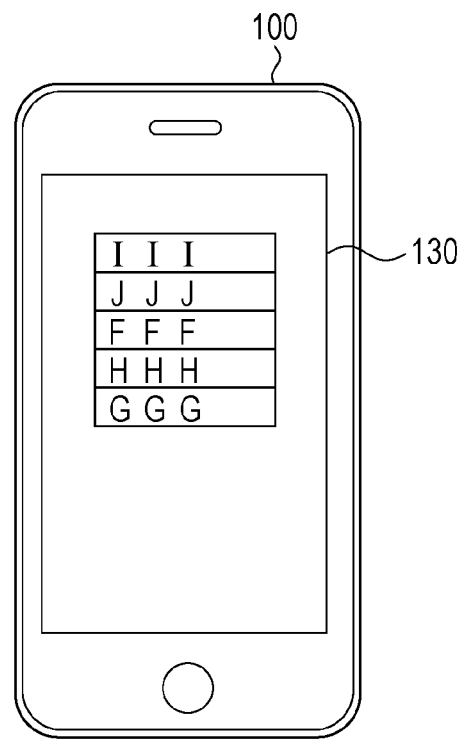
FIG. 14 is a diagram illustrating an example of the display screen.

FIG. 14 is a diagram illustrating an example of the display screen that is displayed on the display unit 130 of the terminal apparatus 100. In the case of the example described above, 4 SSIDs, "FFF", "HHH", "III" and "JJJ", are displayed in such a manner as to be higher on the list than "GGG". That is, "GGG" that is the second SSID which is associated with the radio wave strength that is at or below the threshold is not included in the targets for the display for precedence.

Moreover, in a case where 4 SSIDs, "FFF", "HHH", "III", and "JJJ", are compared with each other, "III" associated with the highest degree of the sameness is the highest on the list, and, among the 4 SSIDs, "HHH" associated with the lowest degree of the sameness is the lowest on the list. That is, the second SSID associated with the high degree of the sameness takes precedence for display over the second SSID associated with the low degree of the sameness.

Furthermore, in a case where 2 SSIDs, "FFF", and "JJJ", are compared with each other, "JJJ" associated with a high radio wave strength is high on the list, and "FFF" associated with a low radio wave strength is low on the list. That is, in a case where the degree of the sameness is equal, the second SSID associated with a strong radio wave strength takes precedence for display over the second SSID associated with a low radio wave strength.

With the display of a screen that is illustrated in FIG. 14, it is possible that the second SSID is displayed in a mode in which the results of the determination are listed in order of decreasing probability that corresponds to the same access point. Accordingly, it is possible that the user is suitably assisted in selecting the SSID. It is noted that in FIG. 14, the mode in which the display for precedence is performed is illustrated, but that, as described above, the display for visibility emphasis may be performed.

3.2.5 Modification Example

It is noted that in the flowchart in FIG. 13 and in an example of the display screen in FIG. 14, the radio wave strength is used for the determination of the threshold, and for the determination of the extent of emphasis or the extent of precedence in a case where the degree of the sameness is equal. In other words, in the example described above, in a case where the radio wave strength is above the threshold, the determination of the extent of emphasis or the extent of precedence is primarily made by the sameness of the SSID. However, in a case where the degree of the sameness of the SSIDs is used, considering the precision of determination, as described above, it is desirable that radio wave strength information is initially used. Consequently, a modification implementation may be performed that increases the degree of contribution by the radio wave strength information in the determination of the extent of emphasis or the extent of precedence.

The processing unit 110 performs processing that categorizes the second SSIDs into multiple groups based on the radio wave strength, and displays, on the display unit 130, the second SSID that is included in a first group to which the SSID associated with a high radio wave strength belongs, in the mode in which display is performed in a manner that is more emphasized for visibility than or the display is performed in a manner that takes precedence over the second SSID that is included in a second group to which the second SSID associated with a low radio wave strength belongs. The grouping is performed by processing that compares the radio wave strength with a second threshold X2 that is higher than the threshold X described above.

In addition to this, the processing unit 110 performs processing that displays, on the display unit 130, the second SSID that is determined as having a high degree of the sameness, among the second SSIDs that are included in the first group, in the mode in which display is performed in a manner that is more emphasized for visibility than or the display is performed in a manner that takes precedence over the second SSID that is determined as having a low degree of the sameness, among the second SSIDs that are included in the first group. Furthermore, the processing unit 110 performs processing that displays, on the display unit 130, the second SSID that is determined as having a high degree of the sameness, among the second SSIDs that are included in the second group, in the mode in which display is performed in a manner that is more emphasized for visibility than or the display is performed in a manner that takes precedence over the second SSID that is determined as having a low degree of the sameness, among the second SSIDs that are included in the second group.

That is, in the present modification example, first, the second SSIDs are categorized in groups based on the radio wave strength information, and the extent of the display for emphasis or the display for reference in the group is determined based on the extent of the sameness.

In this case, in a case where the degree of the sameness of the second SSID that is included in the first group is lower than the degree of the sameness of the second SSID that is included in the second group, the processing unit 110 performs processing that displays, on the display unit 130, the second SSID which is included in the first group, in the mode in which display is performed in a manner that is more emphasized for visibility than or the display is performed in a manner that takes precedence over the second SSID that is included in the second group.

When this is done, the extent of emphasis or precedence for the display of the second SSID associated with an approximately low radio wave strength is suppressed although the degree of the sameness of the second SSID is considerably high. For this reason, it is possible that the second SSID of the access point that has a high probability of being much the same as another access point is emphasized and takes precedence.

An example of a specific display screen is described. A case is considered where 5 SSIDs, "KKK" to "OOO", are acquired as the second SSIDs, and where each second SSIS has the following relationship. It is noted that the SSID is expressed here for convenience, and this expression does not mean that the second SSID is a string of characters that is made up of 3 letters, that is, 3 alphabets. With the determination of the radio wave strength, "NNN" and "OOO" are categorized as ones in the first group, "LLL" and "MMM" are categorized as ones in the second group, and a radio wave strength with "KKK" is associated is at or below the threshold. Specifically, it is determined that radio wave strengths with which "NNN" and "OOO" are associated are above the second threshold X2, and that radio wave strengths with which "LLL" and "MMM" are associated is above the threshold X and is at or below the second threshold X2. Furthermore, in a case where SSIDs are compared in terms of the sameness, a relationship among the SSIDs is "NNN">"MMM">"OOO">"LLL".

Figure 15:
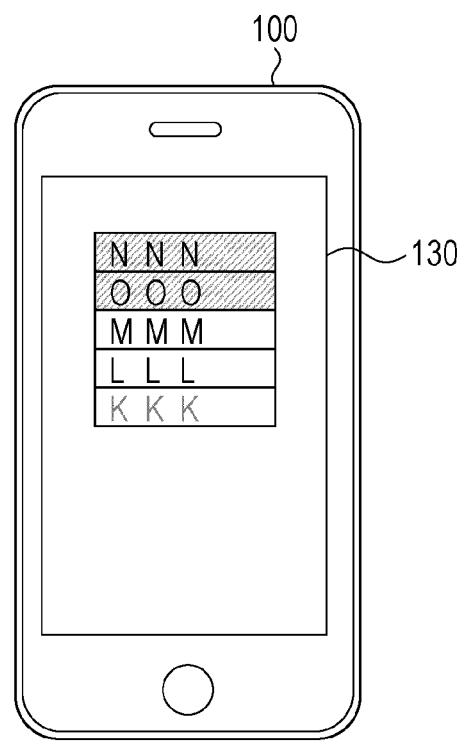
FIG. 15 is a diagram illustrating an example of the display screen.

FIG. 15 is a diagram illustrating an example of the display screen that is displayed on the display unit 130 of the terminal apparatus 100. In the case of the example described above, "KKK" that is the second SSID which is associated with the radio wave strength that is at or below the threshold is not included in the targets for the display for precedence, and are displayed in such a manner as to be the lowest on the list. Moreover, in the example in FIG. 15, the letters "KKK" are thinly displayed, and thus other second SSIDs are displayed relatively in a manner that is emphasized for visibility.

Moreover, in a case where 4 SSIDs, "LLL", "MMM", "NNN", and "OOO", are compared with each other, "NNN" and "OOO" that are categorized as ones in the first group are displayed on higher positions than "LLL" and "MMM" that are categorized as ones in the second group, and background colors thereof are changed. That is, the second SSID that is included in the first group is displayed in a manner that is more emphasized for visibility than, and in a manner that takes precedence over, the second SSID that is included in the second group, which is associated with a low radio wave strength.

Furthermore, "NNN" is displayed in such a manner as to be higher on the list than "OOO" and "MMM" is displayed in such a manner as to be higher on the list than "LLL". That is, in the same group, the second SSID that is determined as having a high degree of the sameness takes precedence for display over the second SSID that is determined as having a low degree of the sameness. At this point, the degree of the sameness of "MMM" is higher than the degree of the sameness of "OOO", but as illustrated in FIG. 15, "OOO" is displayed in a manner that is more emphasized for visibility than, and in a manner that takes precedence over, "MMM". That is, the extent of emphasis and the extent of precedence are not reversed outside of the group, and contribution of the degree of the sameness to the determination of the extent of emphasis or the extent of precedence can be suppressed.

4. System, Program, and Others

Furthermore, a target in which the technique according to the present embodiment finds application is not limited to the terminal apparatus 100 that has been described above.

For example, the technique according to the example embodiment, as illustrated in FIG. 2, can find application in the communication system 10 that includes the terminal apparatus 100 and the electronic equipment 200, which are described above.

Furthermore, one or several of, or most of, the processing operations by the terminal apparatus 100 according to the present embodiment may be realized by a program. In this case, a CPU or the like executes the program, and thus the terminal apparatus 100 and the like according to the present embodiment are realized. Specifically, the program that is stored in a non-transitory computer-readable information storage medium is read, and the processor such as the CPU executes the program that is read. At this point, the information storage medium here is a computer-readable medium. A program, data, and the like are stored in the information storage medium. A function of the information storage medium can be realized by an optical disk, such as a DVD or a CD, an HDD, a memory, or the like. Then, the processor such as the CPU performs various processing operations according to the present embodiment based on the program that is stored in the information storage medium. That is, a program that causes a computer to function as each unit according to the present embodiment is stored in the information storage medium. Specifically, the program according to the present embodiment is a program that causes the processing unit 110 of the terminal apparatus 100 to perform each of the steps that are illustrated in FIG. 9 or 13.

Furthermore, the technique according to the present embodiment can find application in a display control method that performs one or several of, or all of the processes that are illustrated in FIG. 9 or 13, a communication control method, a method of controlling the terminal apparatus 100, or a method of operating the terminal apparatus 100.

As described above, the terminal apparatus according to the present embodiment includes a communication unit that performs communication with an access point and electronic equipment, a display unit, and a processing unit that performs control of the communication unit and display processing by the display unit. The processing unit acquires the first SSID that is the SSID of the access point to which the communication unit already made the connection, acquires multiple second SSIDs that are obtained by the electronic equipment by performing the scanning processing, and obtains the degree of the sameness of the first SSID and the second SSID. The processing unit performs processing that displays, on the display unit, the second SSID that is determined as having a high degree of the sameness, in the mode that display is performed in a manner that is more emphasized for visibility than or the display is performed in a manner that takes precedence over the second SSID that is determined as having a low degree of the sameness.

According to the present embodiment, the terminal apparatus determines the degree of the sameness of the first SSID that corresponds to the access point to which the terminal apparatus already made, and of the second SSID obtained by the electronic equipment, and performs the display processing that is based on a result of the determination. When this is done, in a case where multiple SSIDs are included in one access point, even if the electronic equipment cannot refer to the SSID of the access point to which the terminal apparatus already made the connection, it is also possible that the user is urged to perform an operation for making the terminal apparatus and the electronic equipment to the same access point.

Furthermore, according to the present embodiment, the processing unit acquires the radio wave strength information that corresponds to the second SSID, which is the radio wave strength information indicating the radio wave strength, from the electronic equipment, and the processing unit may control the degree of the display of the second SSID for visibility emphasis or for precedence based on the degree of the sameness and the radio wave strength information.

In this manner, by using together the result of the determination of the degree of the sameness of the SSIDs and the radio wave strength information, it is possible that an SSID having a high probability of corresponding to much the same access point is displayed in a manner that is emphasized for visibility or in a manner that takes precedence.

Furthermore, according to the present embodiment, in a case where multiple second SSIDs that are determined as having an equal degree of the sameness are present, the processing unit may perform processing that displays, on the display unit, the second SSID which corresponds to the radio wave strength information indicating a high radio wave strength in the mode in which display is performed in a manner that is more emphasized for visibility than or the display is performed in a manner that takes precedence over the second SSID which corresponds to the radio wave strength information indicating a low radio wave strength.

When this is done, it is possible that the SSID that is determined as being associated with a high radio wave strength is displayed in a manner that is emphasized for visibility or in a manner that takes precedence.

Furthermore, according to the present embodiment, the processing unit performs processing that categorizes the second SSIDs into multiple groups based on the radio wave strength information, and displays, on the display unit, the second SSID that is included in a first group to which the SSID associated with a high radio wave strength belongs, in the mode in which display is performed in a manner that is more emphasized for visibility than or the display is performed in a manner that takes precedence over the second SSID that is included in a second group to which the second SSID associated with a low radio wave strength belongs. Furthermore, the processing unit may display, on the display unit, the second SSID that is determined as having a high degree of the sameness, among the second SSIDs that are included in the first group, in the mode in which display is performed in a manner that is more emphasized for visibility than or the display is performed in a manner that takes precedence over the second SSID that is determined as having a low degree of the sameness, among the second SSIDs that are included in the first group. Furthermore, the processing unit may display, on the display unit, the second SSID that is determined as having a high degree of the sameness, among the second SSIDs that are included in the second group, in the mode in which display is performed in a manner that is more emphasized for visibility than or the display is performed in a manner that takes precedence over the second SSID that is determined as having a low degree of the sameness, among the second SSIDs that are included in the second group. Furthermore, In this case, in a case where the degree of the sameness of the second SSID that is included in the first group is lower than the degree of the sameness of the second SSID that is included in the second group, the processing unit may perform processing that displays, on the display unit, the second SSID which is included in the first group, in the mode in which display is performed in a manner that is more emphasized for visibility than or the display is performed in a manner that takes precedence over the second SSID that is included in the second group.

When this is done, the radio wave strength information is used for the group categorization, and the result of the determination of the degree of the sameness of the SSID's is used for the processing that determines the mode in which the display is performed on a per-group basis. Thus, it is possible that the display is performed in a suitable mode.

Furthermore, the processing unit may perform processing that does not include the second SSID, which is associated with the radio wave strength that is at or below a given threshold, in the targets for the display for visibility emphasis or the display for precedence.

When this is done, the second SSID that has a low probability of corresponding to an access point that is the same as the access point to which the terminal apparatus already made the connection can be suppressed from being erroneously displayed in a manner that is emphasized for visibility or in a manner that takes precedence.

Further, according to the present embodiment, the degree of the sameness may be the degree of the sameness of the front-side characters.

When this is done, it is possible that the degree of the sameness of the front-side characters is used as the degree of the sameness of the SSIDs.

Furthermore, according to the present embodiment, the communication unit may include a first communication unit that performs communication with an access point in compliance with the first wireless communication scheme, and a second communication unit that performs communication with electronic equipment in compliance with the second wireless communication scheme.

When this is done, an unsuitable determination of whether or not the vendors are the same can be suppressed from being made. For example, the transmission and reception of the information transmission and reception are performed using communication in compliance with the second wireless communication scheme. Thus, it is possible that establishment of a connection between the electronic equipment in compliance with the first wireless communication scheme and the access point is realized using the terminal apparatus.

Furthermore, according to the present embodiment, the first SSID may be an SSID that corresponds to the communication which uses the first frequency band in compliance with the first wireless communication scheme, and the second SSID may be an SSID that corresponds to the communication which uses the second frequency band in compliance with the first wireless communication scheme.

When this is done, in a case where communication frequency bands that correspond to the terminal apparatus and the electronic equipment, respectively, are different from each other, it is also possible that display is performed for connection the terminal apparatus and the electronic equipment to the same access point.

Furthermore, the present embodiment relates to a communication system that includes any terminal apparatus described above and electronic equipment.

Furthermore, a program according to the present embodiment causes a computer to function as the processing unit that performs the control of the communication unit which performs the communication with the access point and the electronic equipment, and the display processing by the display unit. The processing unit acquires the first SSID that is the SSID of the access point to which the communication unit already made the connection, acquires multiple second SSIDs that are obtained by the electronic equipment by performing the scanning processing, and obtains the degree of the sameness of the first SSID and the second SSID. The processing unit performs processing that displays, on the display unit, the second SSID that is determined as having a high degree of the sameness, in the mode that display is performed in a manner that is more emphasized for visibility than or the display is performed in a manner that takes precedence over the second SSID that is determined as having a low degree of the sameness.

Furthermore, a method of controlling a terminal apparatus according to the present embodiment, which is a method of controlling a terminal apparatus that includes a communication unit which performs communication with an access point and electronic equipment, includes acquiring a first SSID that is an SSID of an access point to which the communication unit already made the connection, acquiring multiple second SSIDs that are SSIDs which are obtained by the electronic equipment by performing scanning processing, and obtaining the degree of the sameness of the first SSID and the second SSID, from the electronic equipment. Furthermore, the processing performs processing that displays, on the display unit, the second SSID that is determined as having a high degree of the sameness, in the mode that display is performed in a manner that is more emphasized for visibility than or the display is performed in a manner that takes precedence over the second SSID that is determined as having a low degree of the sameness.

It is noted that the present embodiment is described in detail above, but that a person of ordinary skill in the art can easily understand that many modifications are possible which do not substantially depart from new matters or effects according to the present disclosure. Therefore, such modification examples are all included within the scope of the present disclosure. For example, the term that is described at least one time together with a different term that has a broader meaning or the same meaning, in the specification or the drawings, can be replaced with the different term, at any place in the specification or the drawings. Furthermore, combination of the present embodiment and all modification examples are also included in the scope of the present disclosure. Furthermore, configurations of, and operations by, the terminal apparatus, the electronic equipment, and the like are also not limited to those which are described according to the present embodiment, and various modification implementations are possible.

What is claimed is:

1. A terminal apparatus comprising:
a communication circuit that performs communication with an access point identified by first identification information and electronic equipment;
a display, and
a processor that performs control of the communication circuit and display processing by the display, wherein
the electronic equipment performs a scanning process to obtain second identification information for identifying a connection destination available for connection,
the communication circuit receives the second identification information from the electronic equipment,
the processor:
determines a degree of sameness of the first identification information for identifying the access point to which the communication circuit already made a connection, and the second identification information for identifying the connection destination available for connection to, the electronic equipment, and
performs display processing of displaying, on the display, specification information for specifying the second identification information determined as having a high degree of the sameness, in a mode in which display is performed in a manner that is more emphasized for visibility than or the display is performed in a manner that takes precedence over specification information for specifying the second identification information determined as having a low degree of the sameness.

2. The terminal apparatus according to claim 1, wherein
the communication circuit acquires, from the electronic equipment, radio wave strength information that is radio wave strength information indicating a radio wave strength and that corresponds to the second identification information, and
the processor controls, based on the degree of the sameness and the radio wave strength information, an extent of the display of the specification information for visibility emphasis or for precedence.

3. The terminal apparatus according to claim 2, wherein
when multiple pieces of second identification information, determined as having an equal degree of the sameness, are present, the processor performs the display processing of displaying the specification information that corresponds to the radio wave strength information indicating a high radio wave strength in the mode in which display is performed in a manner that is more emphasized for visibility than or the display is performed in a manner that takes precedence over the specification information that corresponds to the radio wave strength information indicating a low radio wave strength.

4. The terminal apparatus according to claim 2, wherein
the processor performs processing of excluding the specification information associated with the radio wave strength that is at or below a given threshold, from targets for the display for visibility emphasis or the display for precedence.

5. The terminal apparatus according to claim 1, wherein
the degree of the sameness is a degree of sameness of front-side characters.

6. The terminal apparatus according to claim 1, wherein
when the specification information displayed on the display, is selected, the communication circuit transmits the identification information corresponding to the selected specification information to the electronic equipment to cause the electronic equipment to establish a communication between the electronic equipment and the access point.

7. The terminal apparatus according to claim 1, wherein the display displays a screen for inputting a password and the communication circuit transmits an SSID and the inputted password to the electronic equipment to cause the electronic equipment to establish a communication between the electronic equipment and the access point.

8. The terminal apparatus according to claim 1, wherein the communication circuit starts communication which uses identifier that corresponds to the specification information, which is selected by a user from among identifiers that are displayed on the display, in accordance with the selection.

9. The terminal apparatus according to claim 1, wherein the communication circuit includes
a first communication circuit that performs communication with the access point in compliance with a first wireless communication scheme, and
a second communication circuit that performs communication with the electronic equipment in compliance with a second wireless communication scheme.

10. The terminal apparatus according to claim 9, wherein the first identification information is the identification information that corresponds to communication which uses a first frequency band in compliance with the first wireless communication scheme, and
the second identification information is the identification information that corresponds to communication which uses a second frequency band in compliance with the first wireless communication scheme.

11. A communication system comprising:
the terminal apparatus according to claim 1; and
the electronic equipment.

12. A non-transitory computer-readable storage medium that stores a program that is readable by a computer having a communication circuit that performs communication with an access point identified by first identification information and a second communication unit that performs communication with electronic equipment, the computer performs, based on the program, processing comprising:
causing the electronic equipment to perform scanning process to obtain second identification information for identifying a connection destination available for connection;
receiving the second identification information from the electronic equipment via the communication circuit;
determining a degree of sameness of the first identification information for identifying the access point to which the communication circuit already made a connection, and the second identification information for identifying the connection destination available for connection to, the electronic equipment; and
performing notification processing of notifying a user of specification information for specifying the second identification information determined as having a high degree of the sameness in a manner that is more emphasized for visibility than or a display processing is performed in a manner that takes precedence over specification information for specifying the second identification information determined as having a low degree of the sameness.

* * * * *